US006785886B1

(12) United States Patent
Lim et al.

(10) Patent No.: US 6,785,886 B1
(45) Date of Patent: Aug. 31, 2004

(54) DEFERRED SHADOWING OF SEGMENT DESCRIPTORS IN A VIRTUAL MACHINE MONITOR FOR A SEGMENTED COMPUTER ARCHITECTURE

(75) Inventors: Beng-Hong Lim, Menlo Park, CA (US); Bich C. Le, San Jose, CA (US); Edouard Bugnion, Mountain View, CA (US)

(73) Assignee: VMWare, Inc., Palo Alto, CA (US)

( * ) Notice: Subject to any disclaimer, the term of this patent is extended or adjusted under 35 U.S.C. 154(b) by 726 days.

(21) Appl. No.: 09/648,394

(22) Filed: Aug. 24, 2000

Related U.S. Application Data

(63) Continuation-in-part of application No. 09/179,137, filed on Oct. 26, 1998, now Pat. No. 6,397,242.
(60) Provisional application No. 60/085,685, filed on May 15, 1998.

(51) Int. Cl.$^7$ .......................... G06F 9/455; G06F 12/00
(52) U.S. Cl. ................. 718/1; 711/6; 711/202; 711/203; 711/206; 711/208
(58) Field of Search ..................... 709/1; 711/6, 118, 711/135, 154, 202, 203, 206, 208–210, 221

(56) References Cited

U.S. PATENT DOCUMENTS

| 4,253,145 A | 2/1981 | Goldberg |
| 4,400,769 A | 8/1983 | Kaneda et al. |

(List continued on next page.)

FOREIGN PATENT DOCUMENTS

| EP | 0 337 463 A2 | 10/1989 |

(List continued on next page.)

OTHER PUBLICATIONS

MacKinnon, R.A., "The changing virtual machine environment: Interfaces to real hardware, virtual hardware, and other virtual machines," IBM Syst. J., vol. 18, No. 1 (1979).

(List continued on next page.)

*Primary Examiner*—Meng-Al T. An
*Assistant Examiner*—Syed J. Ali
(74) *Attorney, Agent, or Firm*—Jeffrey Pearce

(57) ABSTRACT

One or more virtual machines (VM's) run via a virtual machine monitor (VMM) on a hardware platform that has a segmented memory architecture. Each VM has at least one VM descriptor table that has, as entries, VM segment descriptors. At least one VMM descriptor table is established, including at least one shadow descriptor table that stores shadow descriptors for certain of the VM segment descriptors, which are then shadowed descriptors. The VMM compares the shadow descriptors with their respective corresponding shadowed VM descriptors, detects any lack of correspondence between the shadow descriptor table and the corresponding VM descriptor table, and updates and thereby synchronizes each shadow descriptor with its respective shadowed VM descriptor no later than, and preferably only upon the first use of, the respective descriptor by the VM. Whenever the VMM detects any attempt by the VM to load an unsynchronized shadowed descriptor, the VMM verifies that the VM is allowed to load it, and then establishes synchronization for the pair of descriptors. One detection mechanism is the tracing of entire memory pages in which VM descriptors are stored; another involves sensing and setting the state of a segment present bit for individual descriptors. The invention improves virtualization performance by reducing the number of descriptors that need to be kept coherent. The VMM also has a flexible mechanism to invalidate descriptors, for example, when the VM unmaps or remaps the memory page it is located in, or when the VM sets a new segment descriptor table.

18 Claims, 7 Drawing Sheets

U.S. PATENT DOCUMENTS

| | | | |
|---|---|---|---|
| 4,456,954 A | 6/1984 | Bullions, III et al. | |
| 4,794,522 A | 12/1988 | Simpson | |
| 4,814,975 A | 3/1989 | Hirosawa et al. | |
| 4,970,639 A | 11/1990 | Diefendorf et al. | |
| 4,974,159 A | 11/1990 | Hargrove et al. | |
| 5,023,771 A | 6/1991 | Kishi | |
| 5,063,499 A | 11/1991 | Garber | |
| 5,067,072 A | 11/1991 | Talati et al. | |
| 5,077,657 A | 12/1991 | Cooper et al. | |
| 5,301,287 A * | 4/1994 | Herrell et al. | 711/202 |
| 5,371,879 A | 12/1994 | Schiffleger | |
| 5,392,409 A | 2/1995 | Umeno et al. | |
| 5,437,033 A | 7/1995 | Inoue et al. | |
| 5,438,673 A | 8/1995 | Court et al. | |
| 5,504,922 A | 4/1996 | Seki et al. | |
| 5,768,593 A | 6/1998 | Walters et al. | |
| 5,778,211 A | 7/1998 | Hohensee et al. | |
| 5,781,750 A | 7/1998 | Blomgren et al. | |
| 5,835,743 A | 11/1998 | Zucker | |
| 5,896,522 A | 4/1999 | Ward et al. | |
| 5,918,048 A | 6/1999 | Mealey et al. | |
| 6,009,261 A | 12/1999 | Scalzi et al. | |
| 6,021,469 A | 2/2000 | Tremblay et al. | |
| 6,075,937 A | 6/2000 | Scalzi et al. | |
| 6,142,682 A | 11/2000 | Skogby | |
| 6,298,434 B1 | 10/2001 | Lindwer | |
| 6,385,718 B1 | 5/2002 | Crawford et al. | |
| 6,513,156 B2 | 1/2003 | Bak et al. | |

FOREIGN PATENT DOCUMENTS

| | | |
|---|---|---|
| EP | 0 534 597 A2 | 3/1993 |
| EP | 0 645 701 A2 | 3/1995 |
| EP | 0 709 767 A1 | 5/1996 |
| JP | 02156334 A | 6/1990 |
| JP | 02181282 A | 7/1990 |
| JP | 02187830 A | 7/1990 |
| JP | 3033937 A | 2/1991 |
| JP | 3204731 A | 9/1991 |
| JP | 05-216689 | 8/1993 |
| JP | 07334372 A | 12/1995 |
| JP | 08036496 A | 2/1996 |
| JP | 08305583 A | 11/1996 |

OTHER PUBLICATIONS

Hookway, Raymond J, et al., "DIGITAL FX!32: Combining Emulation and Binary Translation," Digital Technical Journal, vol. 9, No. 1, pp. 3–12 (1997).

Buzen, J.P., et al., "introduction to VIRTUAL Machines," Honeywell Computer Journal, pp. 254–250, dated unknown.

Rosenblum, Mendel, et al., "Using the SimOS Machine Simulator to Study Complex Computer Systems," ACM Transactions on Modeling and Computer Simulation, vol. 7, No. 1, pp. 78–103, Jan. 1997.

Bugnion, Edouard, et al., "Disco: Running Commodity Operating Systems on Scalable Multiprocessors," Stanford University, Computer Systems Laboratory, 1997.

Witchel, Emmett and Rosenblum, Mendel, "Embra: Fast and Flexible Machine Simulation," Sigmetrics '96 5/96 PA/USA, pp. 68–79, 1996.

Bedichek, Robert C., "Talisman: Fast and Accurate Multicomputer Simulation," Sigmetrics '95, Ottawa, Ontario, Canada, pp. 14–24, 1995.

Reinhardt, Steven K., et al., "The Wisconsin Wind Tunnel: Virtual Prototyping of Parallel Computers," ACM Sigmetrics 5/93/CA,USA, pp. 48–60, 1993.

Sites, Richard L., et al., "Binary Translation," Communications of the ACM, vol. 36., No. 2, pp. 69–81, Feb. 1993.

Hall, Judith S., et al., "Virtualizing the VAX Architecture," ACM 0-89791-394-9/91/0005/0380, pp. 380–389, 1991.

Intel Corp., "Intel 80386 System Software Writer's Guide," Chapter 9, 1987.

Galley, S.W., "PDP-10 Virtual Machines," Project MAC, Massachusetts Institute of Technology, pp. 30–34, date unknown.

Popek, Gerald J., "Formal Requirements for Virtualizable Third Generation Architectures," Communications of the ACM, vol. 17., No. 7, pp. 412–421, 1974.

Goldberg, Robert P., "Survey of Virtual Machine Research," Honeywell Information Systems and Harvard University, pp. 34–45, 1974.

Bedichek, Robert, "Some Efficient Architecture Simulation Techniques," Dept. of Computer Science, FR–35, University of Washington Seattle, Washington, date unknown.

Mallach, Efrem G., On the Relationship Between Virtual Machines and Emulators, Honeywell Information Systems, Billerica, Massachusetts, pp. 117–126, date unknown.

Deutsch, L. Peter, "Efficient Implementation of the Smalltalk–80 System," ACM 0-89791-125-3/84/001/0297, pp. 297–302, 1983.

Hazzah, Karen, "Writing Windows VxDs and Device Drivers," R&D Books, Lawrence, Kansas, pp. i–iii and 1–18, 1997.

Amdahl Corp., "Millennium 2000A Series servers, General Information Guide," pp. 3–27, 2000.

Lerche, Robert A. (Amdahl Corp.), "VM/Performance Enhancement Technical Information Exhange," pp. i–iii and 3–12, Aug. 1979.

Doran, Robert W. (Amdahl Corp.), Amdahl Multiple-Domain Architecture, pp. 20–28, Oct. 1988.

Amdahl Corp., "VM/Performance Enhancement General Information," 1978.

Amdahl Corp., "Product Announcement, Amdahl VM/Performance Enhancement, Product No. 4PV0–P1," Nov. 29, 1978.

Malan, Gerald, et al., "DOS as a Mach 3.0 Application," School of Computer Science, Canegie Mellon University, undated.

Microsoft Corp., "Microsoft Windows/386: Creating a Virtual Machine Environment," Microsoft Systems Journal, vol. 2., No. 4, Sep. 1987.

Asche, Ruediger R., "The Little Device Driver Writer," web content from www.microsoft.com, pp. 1–22, Mar. 24, 2003.

Borden, T.L., et al., "Multiple operating systems on one processor complex," IBM Systems Journal, vol. 28., No. 1, pp. 104–128, 1989.

Amdahl Corp., "VM/Performance Enhancement, Release 3," undated.

* cited by examiner

DEFERRED SHADOWING OF SEGMENT DESCRIPTORS IN A VIRTUAL MACHINE MONITOR FOR A SEGMENTED COMPUTER ARCHITECTURE

CROSS-REFERENCE TO RELATED APPLICATIONS

This application is a Continuation-in-Part of the U.S. patent application Ser. No. 09/179,137 ("Virtualization System Including a Virtual Machine Monitor for a Computer with a Segmented Architecture"), filed Oct. 26, 1998 now U.S. Pat. No. 6,397,242, which in turn claims priority of U.S. Provisional Patent Application No. 60/085,685, filed May 15, 1998.

BACKGROUND OF THE INVENTION

1. Field of the Invention

This invention relates to a computer virtualization system and a related method of operation, in particular in the context of one or more virtual machines running on a virtual machine monitor, which in turn is running on underlying hardware with a segmented architecture.

2. Description of the Related Art

The operating system plays a special role in today's personal computers and engineering work stations. Indeed, it is the only piece of software that is typically ordered at the same time the hardware itself is purchased. Of course, the customer can later change operating systems, upgrade to a newer version of the operating system, or even re-partition the hard drive to support multiple boots. In all cases, however, a single operating system runs at any given time on the computer. As a result, applications written for different operating systems cannot run concurrently on the system.

Various solutions have been proposed to solve this problem and eliminate this restriction. These include virtual machine monitors, machine simulators, application emulators, operating system emulators, embedded operating systems, legacy virtual machine monitors, and boot managers.

Virtual Machine Monitors

Virtual machine monitors (VMM's) were the subject of intense research in the late 1960's and 1970's. See, for example, R. P. Goldberg, "Survey of virtual machine research," IEEE Computer, Vol. 7, No. 6, 1974. During that time, moreover, IBM Corp. adopted a virtual machine monitor for use in its VM/370 system.

A virtual machine monitor is a thin piece of software that runs directly on top of the hardware and virtualizes all, or at least some subset of, the resources of the machine. Since the exported interface is the same as the hardware interface of the machine, the operating system cannot determine the presence of the VMM. Consequently, when the hardware interface is compatible with the underlying hardware, the same operating system can run either on top of the virtual machine monitor or on top of the raw hardware.

Virtual machine monitors were popular at a time where hardware was scarce and operating systems were primitive. By virtualizing all the resources of the system, such prior art VMMs made it possible for multiple independent operating systems to coexist on the same machine. For example, each user could have her own virtual machine running a single-user operating system.

The research in virtual machine monitors also led to the design of processor architectures that were particularly suitable for virtualization. It allowed virtual machine monitors to use a technique known as "direct execution," which simplifies the implementation of the monitor and improves performance. With direct execution, the VMM sets up the processor in a mode with reduced privileges so that the operating system cannot directly execute its privileged instructions. The execution with reduced privileges generates traps, for example when the operating system attempts to issue a privileged instruction. The VMM thus needs only to correctly emulate the traps to allow the correct execution of the operating system in the virtual machine.

As hardware became cheaper and operating systems more sophisticated, VMM's based on direct execution began to lose their appeal. Recently, however, they have been proposed to solve specific problems. For example, the Hypervisor system provides fault-tolerance, as is described by T. C. Bressoud and F. B. Schneider, in "Hypervisor-based fault tolerance," ACM Transactions on Computer Systems (TOCS), Vol. 14. (1), February 1996; and in U.S. Pat. No. 5,488,716 "Fault tolerant computer system with shadow virtual processor," (Schneider, et al.). As another example, the Disco system runs commodity operating systems on scalable multiprocessors. See "Disco: Running Commodity Operating Systems on Scalable Multiprocessors," E. Bugnion, S. Devine, K. Govil and M. Rosenblum, ACM Transactions on Computer Systems (TOCS), Vol.15, No. 4, November 1997, pp. 412–447.

Virtual machine monitors can also provide architectural compatibility between different processor architectures by using a technique known as either "binary emulation" or "binary translation." In these systems, the VMM cannot use direct execution since the virtual and underlying architectures mismatch; rather, they must emulate the virtual architecture on top of the underlying one. This allows entire virtual machines (operating systems and applications) written for a particular processor architecture to run on top of one another. For example, the IBM DAISY system has recently been proposed to run PowerPC and x86 systems on top of a VLIW architecture. See, for example, K. Ebcioglu and E. R. Altman, "DAISY: Compilation for 100% Architectural Compatibility," Proceedings of the 24th International Symposium on Computer Architecture, 1997.

General Shortcomings of the Prior Art

All of the systems described above are designed to allow applications designed for one version or type of operating system to run on systems with a different version or type of operating system. As usual, the designer of such a system must try to meet different requirements, which are often competing, and sometimes apparently mutually exclusive.

Virtual machine monitors (VMM) have many attractive properties. For example, conventional VMMs outperform machine emulators since they run at system level without the overhead and constraint of an existing operating system. They are, moreover, more general than application and operating system emulators since they can run any application and any operating system written for the virtual machine architecture. Furthermore, they allow modern operating systems to coexist, not just the legacy operating systems that legacy virtual machine monitors allow. Finally, they allow application written for different operating systems to time-share the processor; in this respect they differ from boot managers, which require a complete "re-boot," that is, system restart, between applications.

As is the typical case in the engineering world, the attractive properties of VMMs come with corresponding drawbacks. A major drawback is the lack of portability of the VMM itself—conventional VMMs are intimately tied to the hardware that they run on, and to the hardware they emulate. Also, the virtualization of all the resources of the system generally leads to diminished performance.

As is mentioned above, certain architectures (so-called "strictly virtualizeable" architectures), allow VMMs to use a technique known as "direct execution" to run the virtual machines. This technique maximizes performance by letting the virtual machine run directly on the hardware in all cases where it is safe to do so. Specifically, it runs the operating system in the virtual machine with reduced privileges so that the effect of any instruction sequence is guaranteed to be contained in the virtual machine. Because of this, the VMM must handle only the traps that result from attempts by the virtual machine to issue privileged instructions.

Unfortunately, many current architectures are not strictly virtualizeable. This may be because either their instructions are non-virtualizeable, or they have segmented architectures that are non-virtualizeable, or both. Unfortunately, the all-but-ubiquitous Intel x86 processor family has both of these problematic properties, that is, both non-virtualizeable instructions and non-reversible segmentation. Consequently, no VMM based exclusively on direct execution can completely virtualize the x86 architecture.

Complete virtualization of even the Intel x86 architecture using binary translation is of course possible, but the loss of performance would be significant. Note that, unlike cross-architectural systems such as DAISY, in which the processor contains specific support for emulation, the Intel x86 was not designed to run a binary translator. Consequently, no conventional x86-based system has been able to successfully virtualize the Intel x86 processor itself.

The parent application—U.S. patent application Ser. No. 09/179,137—discloses a system in which one or more virtual machines (VM's) run on a virtual machine monitor, which in turn is installed on hardware with a segmented architecture, such as the well-known and widely used Intel x86 architecture. In the preferred, albeit not required, configuration, the VMM is installed at system level along with an existing, host operating system. This configuration, which is disclosed in the co-pending U.S. patent application Ser. No. 09/151,175 ("System and Method for Virtualizing Computer Systems"), enables the VMM to allow the host operating system itself to manage certain hardware resources required by a VM and thereby to increase speed.

As is well known, in order to provide the operating system with a flexible mechanism to isolate and protect memory areas serving different purposes, the processors in such architectures include various segment registers. For example, a program's code and data may be placed in two different segments to prevent an erroneous data access from accidentally modifying code. A "descriptor" is a structure in memory that is included in these architectures and that defines the base, limit, and protection attributes of a segment. These values are then stored in special registers of the processor. The segments, and thus the descriptors, generally include not only a visible part, which can be accessed by software once loaded, but also a hidden part, which cannot. Segment registers, in particular, their hidden state, improve performance because they are cached inside of the processor. Without them, each memory access would require the processor to read a segment descriptor from memory to determine the segment's base, limit, and protections. This would be very slow because the descriptor itself is stored in memory.

In the context of virtualization, one problem that this leads to is that the state of a segment (descriptor) loaded in the appropriate register of the hardware processor may be non-reversible. Here, this means that it cannot be reconstructed once the descriptor in the VM memory has been modified, inasmuch as the architecture does not provide an instruction to save the contents of the hidden state to a descriptor in memory.

In the prior art, to the extent that the issue was addressed or even recognized at all, non-reversiblility meant that the virtualization of the hardware architecture would be either incomplete or impossible. The invention described in the parent application solves this problem by providing for the VMM to allow the VM to run using faster direct execution as long as possible, but to switch to binary translation whenever a VM action leads, among other possibilities, to non-reversiblility.

The parent application makes this possible in part by including, in the VMM memory space, different types of "copies"—shadow and cached—of the VM descriptors. Cached descriptors emulate the segment-caching properties of the architecture itself, whereas shadow copies correspond to the VM's stored list of descriptors, but with slight modifications, such as altered privilege levels.

The primary purpose of a cached descriptor is to emulate the hidden segment state of a segment register in an x86 virtual processor, and therefore to solve the irreversibility problem. The concepts of "segment caching" and "hidden state" are thus equivalent. Cached descriptors are required for correct and complete virtualization.

Shadow descriptors, on the other hand, are optional, but they greatly improve performance. In particular, they enable direct execution when none of the virtual processors is in a non-reversible state.

Shadow descriptors allow VM instructions to execute directly, but with reduced privileges, and with a restricted address space, thus protecting the VMM. A shadow descriptor is an almost identical copy of a VM descriptor, with the privilege level and segment limit modified slightly; cached descriptors will, similarly, in general also have truncated limits and reduced privileges.

Whenever the VM changes a VM descriptor, the VMM then synchronously, that is, effectively immediately, updates the corresponding shadow descriptor. In order to track such changes, the invention disclosed in the parent application preferably uses the existing memory-tracing mechanism of the hardware, more specifically, the basic page-protection mechanisms provided by the hardware MMU: The VMM unmaps or protects specific VM pages (for example, those containing descriptor tables, but also other data structures) to detect accesses to those pages, without the VM's knowledge of this happening. The hardware then generates an exception, which is sensed by the VMM, whenever the VM writes to a memory page (the smallest portion of memory for which memory tracing is provided) where, for example, the VM's descriptors are stored. The VMM then updates the shadow copies of the descriptors on that page. This use of page protections for this specific purpose is referred to as "memory tracing."

One shortcoming of the arrangement disclosed in the parent application is that the shadow descriptors are always synchronized and are thus often updated unnecessarily: Assume, for example, that a VM sets a new descriptor table (DT) occupying 16 pages. On a system with the x86 architecture, fully 8192 descriptors would then be synchronized, even though only a few will in all likelihood ever be used. This is due primarily to the level of granularity of the memory-tracing mechanism provided by the hardware. The disclosed invention provides other mechanisms that allow the VMM to avoid having to update entire pages worth of descriptors due to VM access of a single descriptor, but at the cost of additional VMM actions that slow down processing.

In general, the problem is that there needs to be some way to ensure that the VM descriptors that the VMM shadows actually correspond to the most current VM descriptors that need to be shadowed. At the same time, the efficiency of the shadowing process should be improved, so that shadow descriptors are updated only when there is no need to do so. This invention provides such a mechanism.

SUMMARY OF THE INVENTION

The invention provides a method and related system for virtualizing a computer system that has a memory, which has a plurality of memory segments, each corresponding to a range of the memory the computer. A virtual machine monitor (VMM) is loaded into the computer system; in the case in which the underlying computer system (the "hardware") is a software simulation or emulation of a physical hardware platform, the VMM is operatively connected to the simulated or emulated hardware. At least one virtual machine (VM), which has at least one virtual processor, is operatively connected to the VMM for running a sequence of VM instructions. The virtual machine (VM) has at least one VM descriptor table that has, as entries, VM segment descriptors, each VM segment descriptor containing memory location identifiers corresponding to a memory segment.

At least one VMM descriptor table is set up in the VMM. This VMM descriptor table includes at least one shadow descriptor table that stores, for predetermined ones of the VM segment descriptors, corresponding shadow descriptors. Each of the predetermined ones of the VM segment descriptors for which a shadow descriptor is stored is then a "shadowed" descriptor. The VMM compares the shadow descriptors with their respective corresponding shadowed VM descriptors; detects a lack of correspondence between the shadow descriptor table and the corresponding VM descriptor table; and updates and thereby synchronizes each shadow descriptor with its respective shadowed VM descriptor no later than the first use upon a first use of the descriptor by the VM, and preferably not until the time the VM first uses the descriptor.

The VMM synchronizes selected ones of the VM segment descriptors. Here "synchronization" means updating the shadow descriptors in the VMM to maintain correspondence with their respective shadowed, synchronized VM descriptors upon every change by the VM to the shadowed, synchronized VM descriptors.

In the preferred embodiment of the invention, the memory segments are hardware memory segments. The computer system includes at least one hardware segment register and at least one hardware descriptor table that has, as entries, hardware segment descriptors. As with other segment descriptors, each hardware segment descriptor contains memory location identifiers corresponding to a memory segment.

The VMM then prevents the VM from accessing and loading unsynchronized shadow descriptors into any hardware segment register. In order to prevent such access and loading, the VMM first detects attempts to do so, using either or both of two mechanisms. One detection mechanism is the tracing of entire memory pages in which VM descriptors are stored; another involves sensing and setting the state of a segment present bit for individual descriptors.

Accordingly, the computer system has a memory management unit (MMU), preferably the preexisting hardware MMU in the computer system. The MMU includes a memory map and is able to trace accesses to designated memory pages and cause a page fault to be generated upon any attempt by software (such as the VM) to access a memory page that is not mapped, that is, not included in the memory map. In the preferred embodiment of the invention, the VMM descriptor table and thus also the shadow descriptors are stored on VMM-associated memory pages. The VMM then selectively maps and unmaps the VMM-associated memory pages. This causes page faults to be generated upon any attempt to load into any hardware segment register a shadow descriptor located on any unmapped VMM-associated memory page.

Upon attempted loading by the VM of a VM segment descriptor into a hardware segment register, the VMM then determines whether a corresponding shadow descriptor exists and is synchronized in the VMM descriptor table. If both these conditions are met, then the corresponding synchronized shadow descriptor is allowed to be loaded. If, on the other hand, the VMM determines that a corresponding synchronized shadow descriptor does not exist, it also determines whether the page containing the VM segment descriptor is mapped. If it is unmapped, then the VMM forwards a corresponding fault to the VM. If the page containing the VM segment is mapped, however, the VMM also maps the page on which the corresponding shadow descriptor is located; synchronizes the shadow descriptor with the VM segment descriptor that the VM attempted to load; and restarts attempted loading of the VM segment descriptor into the respective hardware segment register. This procedure ensures loading of only synchronized shadow descriptors.

In order to enable whole-page detection of attempted loading into any hardware segment register of any shadow descriptors located on a respective page, the VMM determines if the page of the VMM descriptor table containing the synchronized shadow descriptor contains only shadow descriptors. If it does, then the VMM synchronizes all shadow descriptors on the page whenever any one of them is synchronized.

The VMM preferably also senses changes of mapping of any page(s) of the VM descriptor table. The VMM then desynchronizes and prevents access by the VM to all shadow descriptors that correspond to shadowed descriptors on the page(s) of the VM descriptor table whose mapping is being changed. To ensure reversibility of each such VM segment descriptor, the VMM determines whether any VM segment descriptor on the page(s) of the VM descriptor table whose mapping is being changed is currently loaded in any hardware segment register. For each such VM segment descriptor so loaded, the VMM creates a cached copy of the corresponding shadow descriptor.

In order to make possible sensing of accesses or changes to individual descriptors, regardless of other data located on the same memory page, the VMM sets a protection attribute of shadow descriptors to a not present state. Upon attempted loading by the VM of a VM segment descriptor, the VMM then determines whether the protection attribute of the corresponding shadow descriptor is in a present state or in the not present state. If the protection attribute is in the present state, then the VMM loads the corresponding shadow descriptor. If, however, the VMM determines that the protection attribute is in the not present state, the VMM determines whether the page on which the VM segment descriptor is located is mapped. If it is unmapped, then the VMM forwards a corresponding fault to the VM. If, however, the VM segment descriptor is mapped, the VMM synchronizes the shadow descriptor with the VM segment descriptor that the VM attempted to load; sets the protection attribute of the shadow descriptor to the present state; and restarts attempted loading of the VM segment descriptor into the respective hardware segment register.

DETAILED DESCRIPTION

Figure 1:
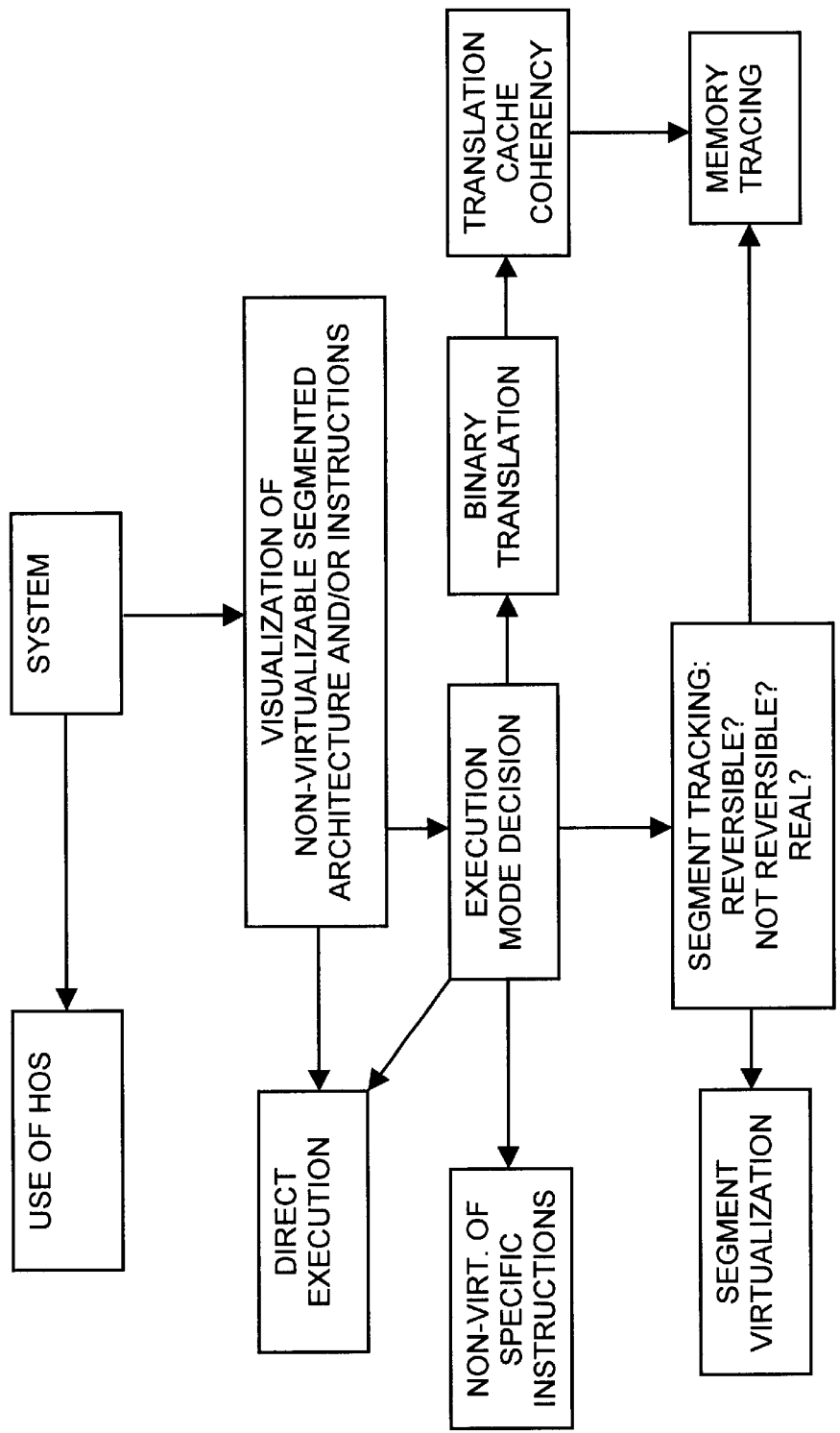
FIG. 1 is a conceptual flow chart of the main ideas and features used in the invention, which also forms a "road map" of the subsequent description of a basic embodiment of the invention.

Many of the structures and concepts found in the parent application U.S. patent application Ser. No. 09/179,137 apply even to this invention. Consequently, for the sake of completeness and clarity, those structures and concepts of relevance to this invention are described first. This includes a discussion of FIG. 1, which is a "road map" of the major features and concepts of the invention disclosed in the parent application, which is also referred to here as the "basic" or "synchronous" embodiment or implementation of the invention.

In the basic implementation of the invention, the virtual machine monitor (VMM) enables dual execution mode operation, that is, the VM instructions are allowed to execute using direct execution as long as possible, but the VMM switches to binary translation as needed. One advantage of the basic implementation of the invention is that it runs well even on commodity Intel-x86 compatible processors. Because this is the best mode of implementing even the present invention, the various components and operational steps that enable dual execution mode operation are described. Note, however, that this invention does not require such a structure, since it is directed primarily to the efficient shadowing of VM segment descriptors (referred to below simply as "VM descriptors") in the context of binary translation.

In connection with the description of the preferred VMM, the structure of a preferred binary translation execution engine is described. Note that binary translation is a technique that allows the efficient emulation of binary instruction sequences. In the discussion of the invention below, binary translation is referred to instead of binary emulation since this is the correct term for the technique used in the preferred embodiment of the invention.

Finally, the unique features of the asynchronous or "deferred" shadowing embodiment of the invention are described.

Architectural Concepts and Issues

Before attempting to understand how the invention uniquely solves various problems allowing it to virtualize hitherto non-virtualizeable computer systems, it is helpful to understand just what these problems are. Because the Intel x86 architecture is so widespread, it is the best (but not only) example of the applicability of the invention.

Non-virtualizeable Instructions

Certain architectures contain non-virtualizeable instructions, that is, instructions that behave differently depending on the privilege level of the processor, but that trap in neither case. If a virtual machine monitor (VMM) were to use direct execution, for example, it would run a virtual operating system with reduced privileges (at a different privilege level), which would lead to a different result, most likely one that the operating system does not expect at all.

To better understand this potential problem, consider the common Intel x86 architecture. In Intel x86-based systems, there are four privilege levels: CPL0, CPL1, CPL2 and CPL3. CPL0 corresponds to the system level and CPL3 corresponds to the user level. (The other two levels are irrelevant to this discussion.) The Intel x86 system contains a register in which the current privilege level is set. This privilege register can be changed only by protected mechanisms, either instructions or exceptions.

Now, in Intel x86 systems, the "IRET" instruction increments the stack pointer by three words when the instructions do not change the privilege level, but by five words when it does change the privilege level. Another example is the "PUSHF" instruction, which saves a set of flags on the stack. One of these flags, namely, the IF flag, determines whether interrupts are enabled or not. When running a virtual machine on the VMM, the VMM cannot allow the virtual machine to effectively disable the machine's interrupts, since this might cause an irrecoverable loss of control, for example if the virtual machine were to go into an infinite loop. The virtual operating system might, however, want to disable the interrupt, but would then "realize" through a PUSHF instruction that the interrupts have not really been disabled.

Segmented Architectures and Segment Reversibility

Segmented architectures are those in which the processor contains segment registers that are used to help manage and provide protection to its address space. These segments are typically loaded into the processor from a portion of memory called the descriptor table(s). Certain segmented architectures define a precise semantic in the case where the processor first loads a given segment and then later modifies the contents of the corresponding descriptor in memory. In certain architectures, the state of the segment loaded in the processor may be non-reversible, that it, it cannot be reconstructed once the contents in memory have been modified. As is explained below, this feature of the processor leads to a significant complication when it comes to virtualizing the processor.

Once again, the Intel x86 serves as an example, indeed, a particularly complicated example—not only does the Intel x86 system have a segmented architecture, but also, at any given time, but the Intel x86 architecture also supports four modes of operation. The "protected" mode is the native mode of the processor. It is the preferred mode of operation, and the one used by modern operating systems on this architecture. Protected mode is a segment architecture with four levels of execution. "Real" mode was the only operating mode of the Intel 8086 processor and is maintained in more modern systems in order to maintain compatibility with this earlier processor. "System management" mode was introduced with the Intel 80386 processor used for power management and OEM differentiation. It resembles real mode in its method of operation. Finally, "virtual-8086" (v-8086) mode was introduced with the Intel 80386 to run legacy 8086 programs in a legacy virtual machine monitor running on top of an operating system running in protected mode. On an Intel x86 or an x86-compatible platform, the invention should therefore preferably virtualize all four modes of execution for the virtualization to be complete.

Practical Virtualization

Apart from non-virtualizeable instructions, which have a different semantic depending on the privilege level, the Intel x86 architecture additionally contains a set of instructions classified by Intel as "available to applications, but useless to applications." These instructions all read some privilege state of the processor. In the context of this invention, the concept "practical virtualization" of the Intel x86 architecture is to be understood follows: No code sequence executed in the virtual machine may corrupt the entire system, but instruction sequences of applications that rely on the "useless but available" instructions are not guaranteed correct execution. Note that it is exceptionally rare that any application includes any of these instructions.

Conceptual Overview of the Invention

FIG. 1 is a "road map" of the following discussion of the basic embodiment of the invention. At the highest level there is of course the computer system that is to incorporate the invention. In most modern computer systems that would incorporate the invention, there is an existing or "host" operating system HOS. The invention can be used both together with a HOS and in systems that have no installed operating system.

Many modern computer systems have either a segmented architecture, or non-virtualizeable instructions, or both. The basic embodiment of the invention can operate successfully in either case, or both. One aspect of accomplishing this versatility is that the invention decides whether direct execution can be used (to gain the greatest performance), or whether binary translation must be used (to gain greater flexibility and portability or because binary translation is necessary to being able to virtualize the instruction sequence at all). If direct execution cannot be used, then certain specific non-virtualizeable (that is, according to the standard definition) instructions must be properly handled.

The decision to use binary translation leads to other potential concerns. These concerns include maintaining translation cache (TC) coherency. In order to ensure such TC coherency, the preferred embodiment of the invention uses a memory tracing mechanism. Moreover, in order to deal with the particular problems inherent in computer systems with a segmented architecture, the invention determines whether writes made to the virtual machine's memory can lead to non-reversible segments.

The invention employs a segment tracking mechanism to deal with the issue of reversibility. It preferably also uses the same memory tracing mechanism it uses to help ensure TC coherency. Moreover, the Intel x86 architecture contains, in addition to its protected, fundamental or "native" mode, a non-native mode of operation such as "real mode," "virtual 8086 (v-8086) mode," and "system management mode." In these non-native modes, the Intel x86 does not load segments from memory. The invention includes a virtualization mechanism for the processor even in this case.

These concepts, and the way in which the invention addresses the related problems, are discussed below.

Structure of the VMM According to the Invention

Figure 2:
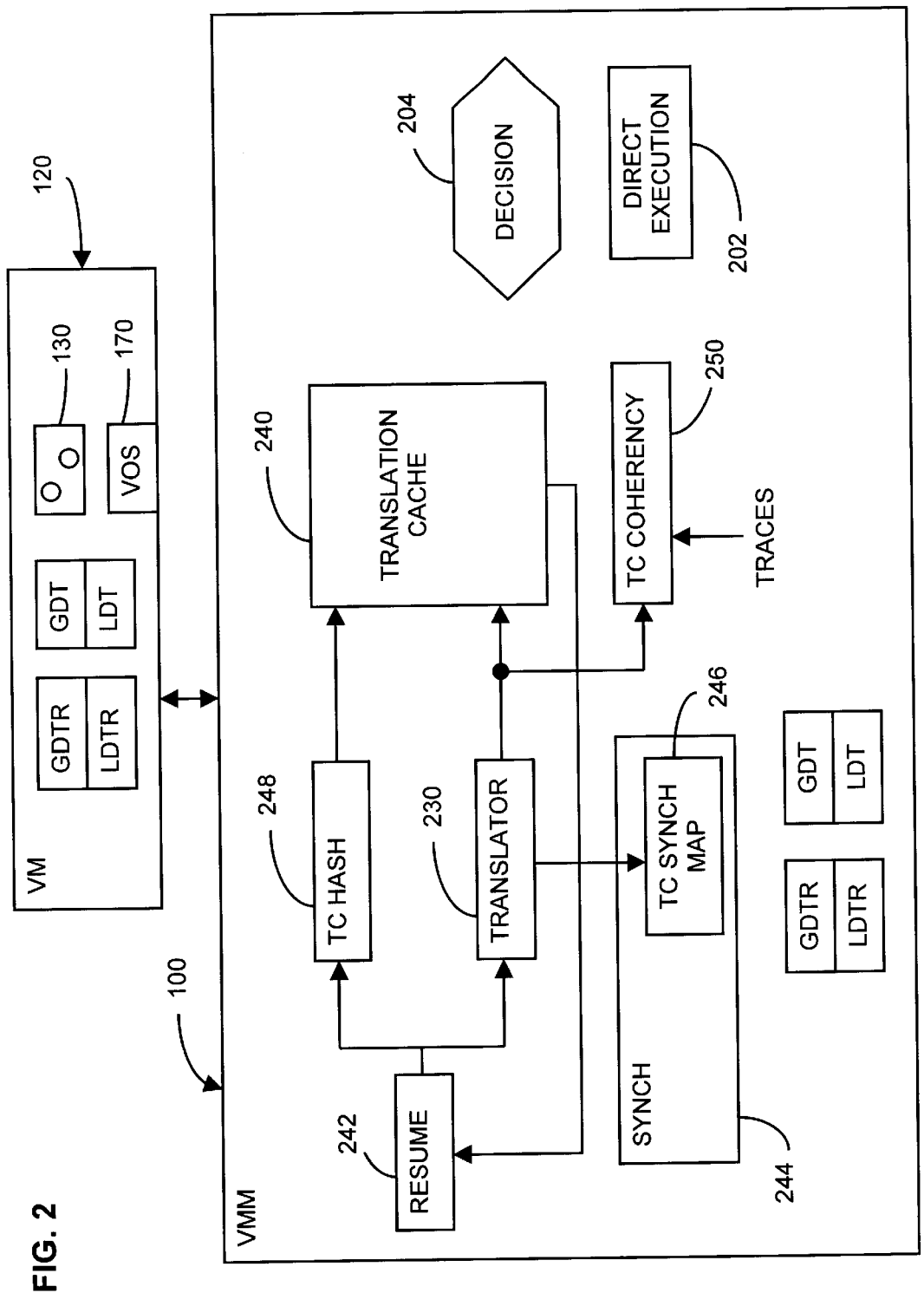
FIG. 2 is a block diagram that shows the various main sub-systems included in the VMM used in the basic embodiment of the invention, especially, the structure of a preferred binary translation execution engine.

See FIG. 2. There are three main portions of the VMM 100 in the basic embodiment of the invention: a binary translation execution engine 200, a direct execution execution engine 202, and a decision sub-system 204 that determines which execution mode to use. FIG. 2 also show a virtual machine 120, which includes a virtual operating system (VOS) 170 and is installed to run on the given hardware platform via the VMM 100.

The concepts and general techniques of binary translation and direct execution are well known in the art. Unique to the invention, however, is that the VMM 100 in the basic embodiment of the invention, which is also the preferred embodiment when using deferred shadowing as described below, incorporates both execution modes, as well as a decision sub-system that selects between the two. According to the invention, the most complicated sub-system, in the sense that most of the inventive features are included in it, is the binary translation execution engine. The direct execution engine is therefore discussed first to allow for concentration on the binary translation sub-system and its method of operation.

Direct Execution Sub-System

There are several known direct-execution execution engines. Any known design may be used in the invention as execution engine 202. For example, prior systems such as VM/370, DISCO, and Hypervisor are based exclusively on direct-execution techniques. This invention is independent of the choice of the direct execution engine. Unique to the basic embodiment of the invention, however, is that it includes both types of execution engines: binary translation as well as direct execution, as well as a mechanism for switching between the two, to virtualize a computer system that has a segmented architecture. As is mentioned above, however, the deferred-shadowing embodiment of the invention described below may be used even in virtualization systems that rely solely on binary translation.

Direct execution is a technique that allows the virtual machine monitor (VMM) to let the virtual machine directly execute its instruction sequences on the underlying hardware processor. However, the VMM sets up the processor with reduced privileges so that the effect of these instructions is guaranteed to be contained to the virtual machine. For example, the VMM can never allow the processor to be effectively set at the lowest (most) privileged level, even when the operating system in the virtual machine requests it.

Instruction set architectures with non-virtualizeable instructions, that is, instructions that behave differently depending on the state of the processor, cannot lead to the design of virtual machine monitors based exclusively on direct execution. However, direct execution may be used to execute the virtual machine whenever privileges need not be reduced, for example, when the virtual machine is executing unprivileged application programs.

This observation leads to one element of the basic embodiment of the invention. Indeed, the use of direct execution to virtualize an Intel x86 architecture also leads to substantial performance improvements over systems that rely exclusively on binary translation since it allows the direct use of all the hardware components. On the other hand, dynamic binary translators such as the ones used in existing virtual machine monitors and machine simulators suffer from substantial overhead, even when they can directly use substantial portions of the memory management unit and the segments.

For example, the direct use of the underlying hardware leads to significant speed improvements over machine simulators such as Shade and SimOS. Second, the system according to the invention runs advantageously on commodity Intel-x86 compatible processors, unlike DAISY where the processor and binary translator were specifically designed with a common goal in mind. Third, the system according to the preferred embodiment of the invention uses the hardware features of the x86 architecture itself to efficiently emulate other x86 codes.

Memory Tracing

Memory tracing is the ability of the VMM to set read-traces or write-traces, or both, on any given physical page of the virtual machine and to be notified of all read and/or write accesses made to that page in a transparent manner. This includes not only the accesses made by the virtual machine running either in binary translation or direct execution mode, but also the accesses made by the VMM itself. Memory tracing is transparent to the execution of the virtual machine, that is, the virtual machine cannot detect the presence of the trace. Moreover, the memory tracing mechanism may request that the set of locations to be traced should be specified with a given granularity, for example, one that would match the page size.

The memory tracing mechanism implemented in the preferred embodiment of the invention uses a combination of the processor's memory management unit (MMU), via page faults, and the ability, using either hardware or software (in particular, the binary-translation sub-system) to execute instructions one-by-one, that is, to single-step the virtual machine. The memory tracing mechanism can be implemented on top of the mechanism that virtualizes the physical address space of the virtual machine. This latter mechanism is present in conventional virtual machine monitors that support multiple virtual machines and can be implemented using known techniques. In the preferred of the invention, it is implemented by having the VMM manage the MMU through an address space separate from the one managed by the VM.

Memory tracing is used in three core modules of the VMM according to the invention:

1) To virtualize the segmented architecture of the virtual processor. Segmented architectures rely on descriptor tables stored in memory. However, virtualization prevents the processor from using directly the virtual machine segment descriptor tables, which forces the processor to keep a second, shadow copy of the tables. Memory tracing on these tables maintains the coherency of the two tables. This is described below.

2) To virtualize the page-table based (hardware-reloaded) MMU of the virtual processor. Again, the VMM cannot directly use the virtual machine's page tables, but rather must maintain a shadow copy. Memory traces on the page table pages guarantees the coherency of the shadow copy. For most architectures, this form of coherency is not required at all times, but rather only at explicit points that flush entries from the processor's "translation-lookaside" buffer. However, memory traces that keep the shadow page tables synchronized with the virtual machine page tables can lead to performance benefits.

3) To guarantee the coherency of the translation cache. When running with binary translation, memory traces placed on the pages that contain translated code guarantee the coherency of the code that is stored in the translation cache with the original virtual machine code.

The use of the MMU has two principal consequences. First, the granularity is fixed to match the page size; in other words, the sub-system can request only that particular pages in memory be traced. Second, since the MMU manages virtual-to-physical mappings and the traces are set on physical pages, the system needs to be able to manage mappings in the "reverse" direction, that is, physical-to-virtual mappings, through so-called "backmaps."

The backmap information is used to efficiently compute the inverse-mmu( ) function, that is, the set of virtual pages that currently map a specific physical page in the real (VMM) page tables. For example, in the preferred embodiment of the invention, the backmap information consists, for each virtual page, of two virtual page numbers. The inverse-mmu( ) function can therefore return zero, one, or two virtual pages that map any given physical page. Note that this backmap information is correct only when a given physical page is never mapped by more than two virtual pages. The VMM ensures that this condition never occurs. When a third page is inserted by the VMM into the page tables, the VMM chooses one of the two existing pages (according to any predefined selection scheme or even simply at random) and evicts it to make room for the incoming page.

To accomplish this memory mapping, the invention preferably implements a method with the following main steps:

1) If a trace is installed on a given page, then all entries returned by the inverse-MMU function have their permissions downgraded. A permission downgrade involves setting pages with a read-write trace to be inaccessible so that both read and write accesses lead to exceptions that are interpreted as traces. The permission downgrade sets pages with a write-only trace to be read-only, so that only writes to the page lead to faults.

2) When an entry is inserted in the MMU, that is, a virtual-to-physical mapping is inserted, the permissions are downgraded according to traces on the physical page.

3) When a page fault occurs as a result of downgraded permissions on a page with a trace, the permission downgrade is temporarily removed and the virtual machine is allowed to complete the instruction that caused the fault.

4) Once the instruction that caused the fault completes, that is, the single-stepping of that instruction is successful, the MMU entry is restored to its original state with permissions downgraded. The subsystems—in particular, the VMM—that requested the trace are then notified of the access. Note that a single instruction can access multiple location in memory, each with a potential trace. In that case, more than one entry is restored and subsystems are notified of the accesses.

5) If the execution of the instruction leads to an exception of the virtual machine, then the MMU entries are restored to their default state. The subsystems are not notified, since the instruction never completed.

Some form of memory tracing mechanism is required to efficiently support translation cache coherency and to virtualize segmented architectures. The method outlined above is preferred because it has proven to be efficient, but other methods are also possible. For example, in the absence of specific hardware support, the main room for alternative solutions is in the implementation of the insertion rule. In the preferred embodiment of the invention, two backmaps are implemented; it would be an obvious adaptation, however, to maintain more than two backmaps.

It would also be an obvious adaptation to handle differently the overflow of the number of backmaps, for example by maintaining an additional flag that is set only when more than the maximal number of backmaps are present in the page tables. The inverse-mmu( ) function called on such a page with the flag set would have the side-effect of flushing the entire page tables before returning the empty set, since it cannot efficiently determine the backmap.

Virtualization of a Segmented Processor Architecture

The invention is able to virtualize even processors with a segmented architecture. Before discussing how the invention accomplishes this in the preferred embodiment, it is helpful to understand just what a segmented architecture even is. Once again, the common Intel x86 architecture will serve as the example.

Segmented Architectures—General

Figure 3:
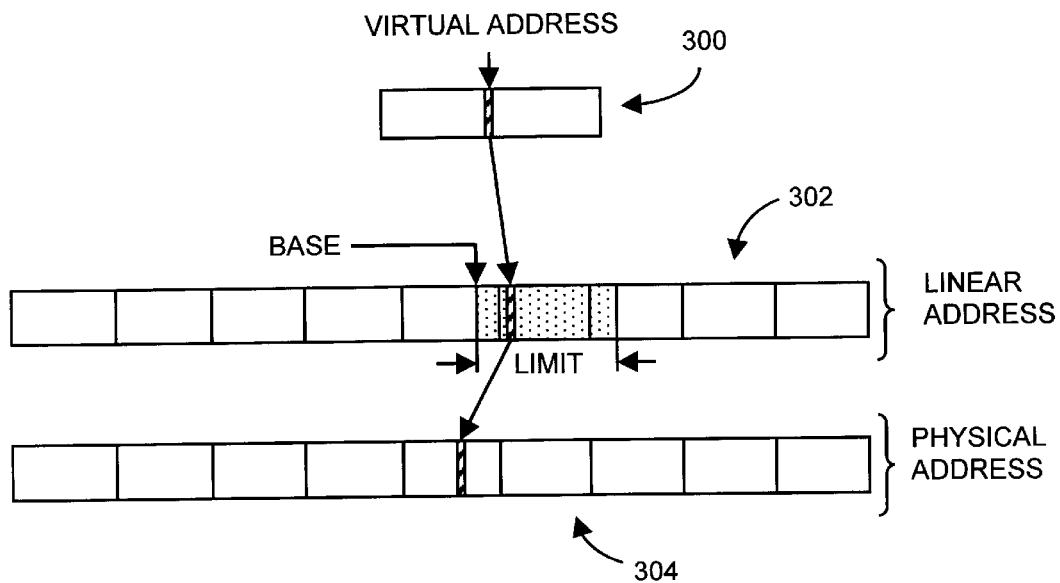
FIG. 3 illustrates the relationship between different address spaces of a segmented memory.

See FIG. 3. In a segmented, paged architecture, memory references and instruction fetches go through two levels of translation, from the virtual address, illustrated as memory portion 300, via a segment in the memory's linear address, shown as address space 302, to the physical address, shown as address space 304. The segment in the linear address space 302 to which the virtual address points is located and delimited by the segment offset from a base (BASE), and the segment limit (LIMIT). As is explained further below, the segments are obtained from registers GDTR and LDTR that point into descriptor tables GDT and LDT.

Each memory reference and instruction fetch issued by the processor consists of a segment register/virtual address pair. The segment register is often determined implicitly by the instruction opcode and addressing mode. However, an instruction prefix can generally override the default segment. For example, the Intel x86 architecture has six segment registers in the processor:

CS—Code Segment, which specifies the currently executing instruction's address, as well as the address of the next instruction.

SS—Stack Segment, which specifies the address of the argument stack;

DS—Data Segment, which is used, in instructions that move constants or other data into a specified memory position; and ES, FS, GS—which act as "extra" segment registers.

The Intel architecture manual gives the complete description of the selection of segment registers.

Figure 4:
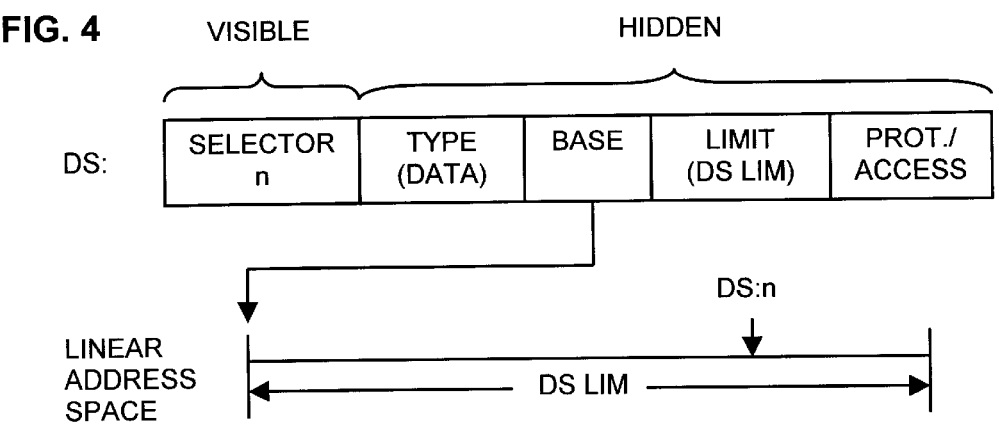
FIG. 4 illustrates the structure and function of a segment register.

FIG. 4 illustrates the general structure of a segment register, in this case, register DS. As is well known for certain architectures such as the Intel x86, each such segment register of the processor contains a visible part and a hidden part. The visible part forms a "selector" that is used to load the segment descriptor, as well as to get or set a particular segment. As is explained below, the selector is an index that points into either the GDT or the LDT to identify from which descriptor the hidden part of the segment register is to be loaded. The hidden part includes portions that specify a type (data or code), a base (offset) address in the linear address space and a limit or length of the segment. Protection or access data is normally also included. As FIG. 4 illustrates, the base and limit (here: DS LIM) are used to translate virtual addresses into linear addresses.

In the particular case of the six-segment register Intel x86 architecture, the six segments might have the following assignments for their selector (visible) and type (hidden). The base, limit and protection entries will of course vary. A special LDT descriptor is also included in the GDT. By way of example only, the segments shown in FIG. 5 might have the following entry assignments:

| Register | Selector | Type |
|----------|----------|------|
| CS | 8 | CODE |
| GS | 12 | DATA |
| DS | 16 | DATA |
| ES | 16 | DATA |
| FS | 16 | DATA |
| SS | 16 | DATA |
| LDT | 40 | DATA |

It should be understood that these selectors are simply examples of possible assignments. Actual values will be assigned by convention. This example is carried further in FIG. 5 below.

Most processor instructions imply some change of or reference to at least one segment. For example, the instruction "ADD 12, [nnn]" means adding 12 to the memory location at address nnn, where nnn is a virtual address which implicitly is part of the data segment "DS." If we refer once again to FIG. 4, the virtual address would be "nnn", and the corresponding linear address would be "nnn+BASE(DS)".

As is discussed above, the Intel x86 architecture contains different modes of operation. In "real mode" and "v-8086 mode," the processor can only set the offset field in the hidden part to the value of the selector multiplied by sixteen. In "protected mode," however, the selector is an index into the global descriptor table (GDT) or local descriptor table (LDT). When the segment register is assigned, the offset, limit and access bits are loaded from these tables, which are stored in memory. As part of this operation, the Intel x86-based systems use a technique known as "segment caching."

Segment caching is a property of the architecture that states that the contents of the segment registers, including the hidden parts, are not modified by a change of mode of operation between real and protected mode and by a modification of the global and local descriptor tables. In other words, the processor defines a caching semantic according to which it goes to the GDT or LDT only explicitly, that is, once a segment is loaded, the hardware processor refers to the contents of the segment's hidden part without further reference to the descriptor tables. The processor can, for example, load a segment in protected mode at index 8 in the global descriptor table and then modify the contents in memory at index 8 in that table. This modification of the descriptor in memory has no impact on the content of the segment register. A segment is then defined to be "non-reversible" if either the processor is currently in a different mode than it was at the time the segment was loaded, or is in protected mode when the hidden part of the segment differs from the current value in memory of the corresponding descriptor.

Segment caching has significant implications for the virtualization of the architecture. One of the requirements of the virtual machine monitor according to the invention is the ability to handle traps (exceptions and interrupts) transparently to the execution of the virtual machine. On a segmented architecture, however, a trap will necessarily cause certain segments to be saved and replaced. If that segment is non-reversible at the time, then the VMM will be unable to restore it, since no copies of the hidden descriptor exist in memory. The manner in which the invention overcomes this problem is through the use of shadow descriptor tables. This is illustrated and described below.

Example of Segment Non-Reversibility

Consider the instruction "MOV value→segment", which involves two operations: 1) set the "selector" (visible) part of the specified segment (for example, DS) to value; and 2) set the hidden part to the contents of the GDT/LDT at the index value. The hidden part, however, as its name implies cannot be accessed by software instructions.

Assume the following instruction sequence:

1) The virtual machine executes instruction "MOV m→DS", which means that the segment (say, X) at GDT offset position m is loaded into the register DS;

2) The virtual machine then changes the contents in position m its GDT from X to Y; this will not affect the segment register DS; and 3) The VMM the executes instruction "MOV n→DS", which means that the segment (say, Z) at GDT offset position n is loaded into the register DS.

Without further measures, then it will be impossible for the VMM to restore the previous setting of DS, since executing the same instruction as in 1) would load Y, not X, since X is no longer at position m in the GDT. The segment has thus become non-reversible. This invention provides a method for overcoming this problem.

Descriptor Tables

In order to virtualize segmented architectures such as the Intel x86, the invention makes use of various descriptor tables. Such tables are well understood in the field of computer design, but a review is helpful for later understanding how the invention sets up and uses "shadow" descriptors.

Figure 5:
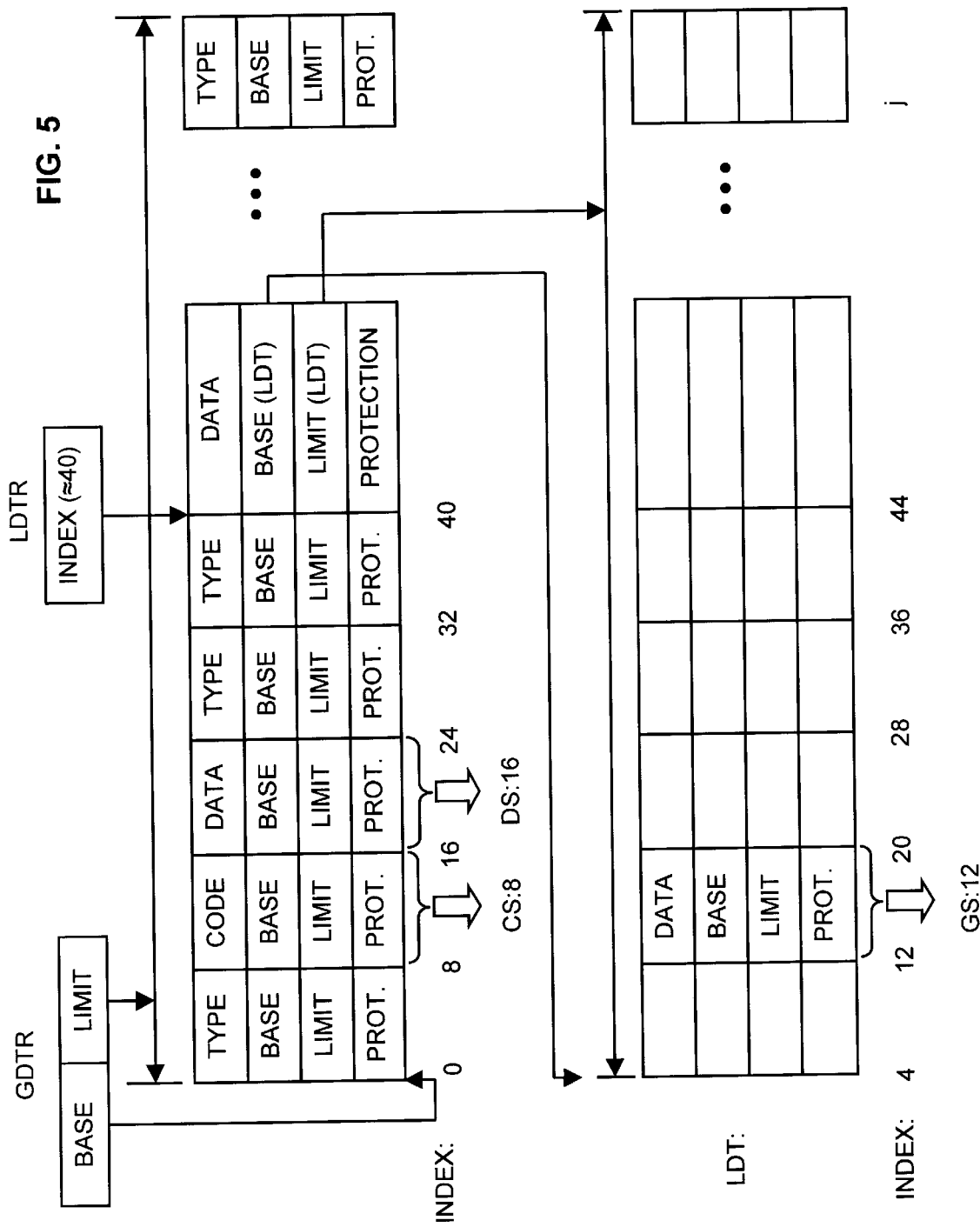
FIG. 5 illustrates the structure and function of descriptor tables used in the VMM according to the invention.

FIG. 5 illustrates the function and structure of the Global Descriptor Table (GDT), the Local Descriptor Table (LDT) and two registers—the Global Descriptor Table Register (GDTR) and the Local Descriptor Table Register (LDTR)—that are used to access the GDT. Note that this terminology is found primarily in descriptions of Intel x86-bases systems, but that analogous descriptor tables are found in other architectures.

The GDTR is a privileged register of the hardware processor, which contains a pointer to the base address in memory of the GDT, as well as an indication of the length or limit of the GDT. As its name implies, the GDT can be viewed as a table. In FIG. 5, each column (four columns are shown merely as an example) corresponds to one "descriptor."

The elements of each descriptor include a type, a base, a limit, and some protection flags. The type can refer, for example, to a DATA segment, or to a CODE segment. For example, on the Intel x86, a DATA type is required to load a descriptor into the DS, SS, ES, FS, and GS segments. A CODE type is required to load a descriptor into CS.

One of the GDT's descriptors also describes the location (base) and size (limit) of the local descriptor table LDT. The LDTR itself is an index (here: equal to 40) into the Global Descriptor Table. The descriptors in the LDT have the same format as the ones in the GDT, that is, each descriptor specifies a type, a base, a limit, and some protection flags.

The processor loads segments from the descriptor tables by means of specific and unprivileged instructions. These instructions determine the value of the segment selector. In Intel x86 systems, the index into the table is determined by all but the lowest 3 bits of the selector. The choice of the table (global or local) is determined by bit 2 of the selector, with a set bit referring to an entry in the local descriptor table and a clear bit to an entry in the global descriptor table.

In the example, the LDTR is set to index 40. This descriptor determines the location and size of the LDT. Furthermore, the CS segment is set by way of example to a selector index of 8, that is, the second descriptor in the global table. The DS, ES and FS are set to an index of 16, and GS is set to a value of 12, the second index in the local descriptor table. (Bit 2 of the binary representation of "12" is set, thus specifying the local table.)

Operating systems typically manage the global and local descriptor table, although certain operating systems are known to export this facility to applications. The choice of the global/local table for a descriptor is left to the software. By convention, operating system descriptors (for example, the ones with the lowest privilege level) are in the global descriptor table. Application-specific descriptors can be put into a local descriptor table. Note also that different applications that are running on the virtual machine can use different LDT's. The VMM can easily switch between these LDT's simply by the proper corresponding assignment of the LDTR.

In order for the VMM to virtualize the existing system, the VMM sets the value of the hardware processor's GDTR to point to the VMM's GDT. Since the GDTR is accessible to system-level procedures such as the VMM, this may be done using known programming techniques.

The illustrated example relates to the Intel x86 architecture, which has an LDT separate from its GDT. Separate descriptor tables are not, however, necessary to implement or manage a segmented memory architecture—one properly structured descriptor table could combine the functions of the GDT and LDT. Modification of the invention to allow its use in such single descriptor-table systems will be obvious to those skilled in the art of virtualization techniques.

Shadow Descriptor Tables

Figure 6:
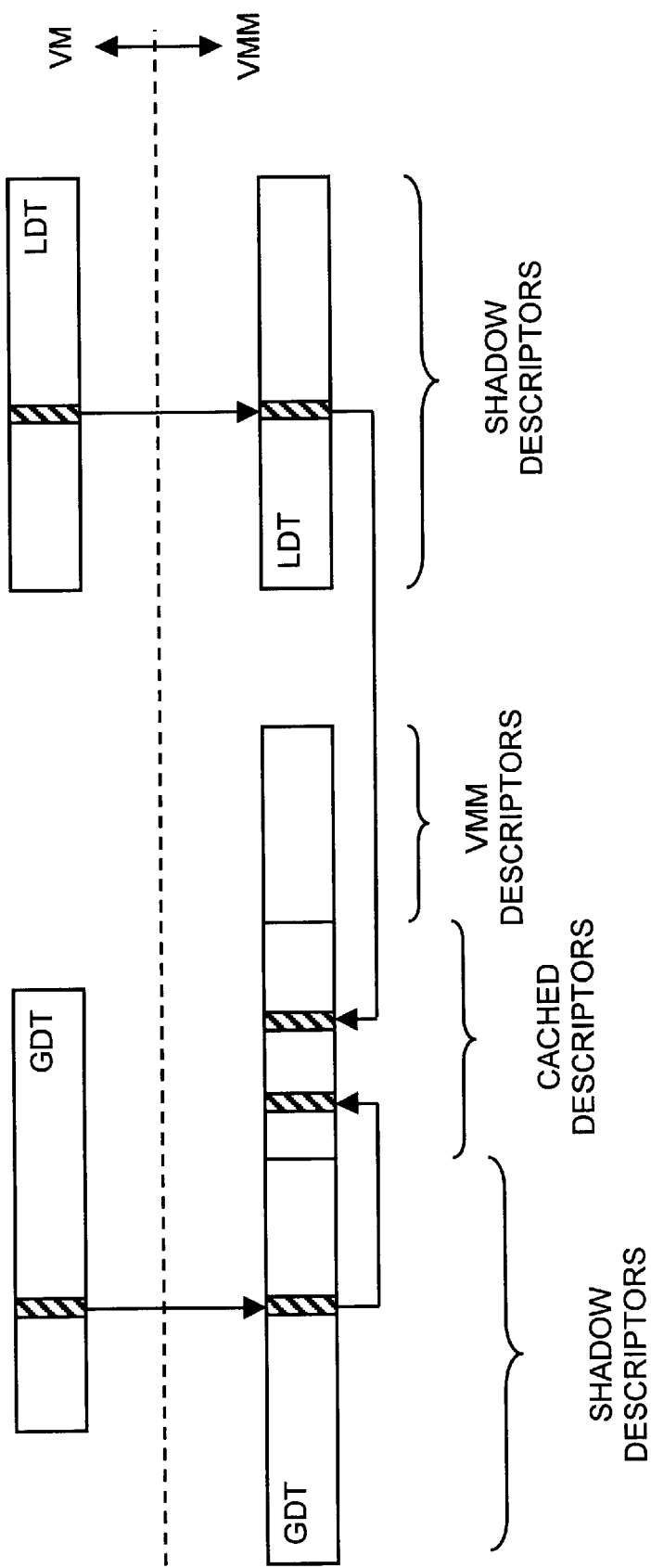
FIG. 6 illustrates shadow descriptor tables used in the VMM according to the invention.

See FIG. 6. The VMM cannot directly use the virtual machine's GDT and LDT, as this would allow the virtual machine to take control of the underlying machine. The VMM therefore must manage the processor's own GDT and LDT and ensure the coherency between the two copies. To accomplish this, the VMM reserves one entry in its own GDT for each segment register of the processor. These "cached descriptors" thus emulate the segment-caching properties of the architecture itself. When the invention is used to virtualize the Intel architecture, for example, there are therefore six cached descriptor entries.

Moreover, the VMM needs to reserve a certain number of entries in the GDT for its own internal purposes. These "VMM descriptors" are also part of the GDT. The remaining entries in the "real" (VMM-based) GDT and LDT thus "shadow," that is, copy and follow the changes in, the entries in the GDT and LDT of the virtual machine. Note that the virtual machine may set its GDT to the maximal size supported by the hardware, or to a size that exceeds the space reserved by the VMM for GDT shadow descriptors. In both cases, there exist descriptors in the virtual machine GDT with no corresponding shadow entries in the VMM-based GDT. As will become clear later, any attempt by the virtual machine to directly use a non-shadowed descriptor will lead first to a general protection fault, and subsequently to a transition to binary translation. Note that the cached descriptors and certain VMM descriptors could alternatively be located in the LDT, thereby reducing the maximal size of the shadow LDT, but increasing the maximal size of the shadow GDT.

Descriptor Conversion of Protected Mode Descriptors

The virtual machine descriptor tables and the real descriptor tables are kept coherent, that is, in correspondence, but not necessarily identical. In one working implementation of the invention for the Intel x86 architecture, for example, the following conversion function is applied to both the shadow entries and the cached entries. This conversion algorithm allows the virtual machine to perform directly and safely segment operations:

1) For DATA and CODE descriptor entries, the shadow entry is the copy of the virtual machine entry, with the following exceptions:
   a) The linear address range of the shadow entry never overlaps with the VMM's own range of the linear address space. (This is required in the preferred embodiment of the invention since the VMM and VM share the same linear address space.) The conversion truncates the range of the shadow segment to ensure this property. The VMM then emulates any general protection faults that result from the truncation.
   b) Entries with a Descriptor Privilege Level (DPL) of 0 in the virtual machine tables have a DPL of 1 in the shadow tables. Direct execution is used only when running at current privilege level 2 and 3. The change from 0 to 1 is required to use the segments in binary translation, which runs at current privilege level 1.
2) For GATE descriptors, the target code segment selector is set to zero in the shadow entry. The virtual machine cannot detect this modification. However, any attempt to jump or call through this gate by the virtual machine in direct execution will lead to a general protection fault, which the VMM handles.

Instructions that load segments are typically not privileged. However, they do check the descriptor privilege level (DPL), which is encoded in the protection flags of the descriptor to be loaded. Attempts to load a segment at a descriptor privilege level smaller (that is, more privileged) than the current privilege level (CPL) of the processor will result in a trap. On the Intel x86 architecture, this trap is a general protection fault.

In direct execution, the invention guarantees that the virtual machine (VM) will never directly load a cached descriptor or a VMM descriptor by setting these descriptors with a descriptor privilege level lower than the lowest CPL supported by direct execution. (In one implementation of the invention, this was level 2.) Attempts by the VM to load a segment that is not a shadow descriptor will therefore always lead to a trap. In order to emulate this trap, when the VMM—specifically, the decision sub-system 204—detects the trap, the decision sub-system activates the binary translation sub-system and cached descriptors are used, since there is no corresponding shadow descriptor.

In binary translation, both the VM and the VMM operate at the same privilege level; consequently, the descriptor privilege level cannot be used to prevent the VM from loading non-shadowed descriptors. The binary translator therefore emulates each segment-loading operation by first checking that the index of the segment corresponds to a shadow descriptor, before loading the segment. If the index does not correspond to the shadow descriptor, then the cached descriptor is used, since there is no shadow descriptor.

Segment Tracing

In the preferred embodiment, segment tracing is used to ensure the coherency of the shadow descriptor tables. If the virtual machine (VM) changes the GDT or LDT through a LGDT or LLDT instruction respectively, then the VMM emulates these privileged instructions. It then scans and converts all the shadow entries of the GDT and LDT. Memory traces are then installed on the virtual machine's global and local descriptor tables. In the basic embodiment of the invention, changes made by the virtual machine's operating system to either table are therefore immediately reflected in the shadow tables.

The VMM thus stores accesses to the virtual machine's GDT and LDT according to the following routine:
1) If a write is made to the virtual machine's GDT/LDT, then check whether the write corresponds to a currently loaded segment.
2) If it does not, then copy the write down into the VMM's shadow copy of the virtual machine's GDT/LDT (but convert any system-level VM descriptor to a user-level descriptor, since the VM cannot be allowed to run at actual system level).
3) If it does correspond to a loaded segment, then:
   a) Copy the old contents of the VMM's GDTlLDT into a cached copy, with one entry per segment;
   b) Update the contents of the VMM's shadow GDT/LDT to correspond to the current, written-to GDT/LDT values of the VM; and
   c) Switch to binary translation, since there are now two different notions of the segment selectors (the actual VM selector and the used selector that's now one of the cached entries).

This procedure can be likened to a hike with no navigational aids along a narrow, tortuous trail through a forest obscured by fog so impenetrable that one can see only one step ahead. As long as one remains on and follows the trail exactly, there is no ambiguity concerning the proper direction to walk in. As soon as one leaves the main trail, however, then returning to the original trail would be impossible barring incredible luck. One way to leave the main trail "reversibly," that is, so that one can find one's way back to it, would be to carry some marker, say, a length of string, one end of which would be staked to the main trail and which would be unwound as one walked into the forest. One would then simply follow the string back in order to return to the main trail.

In the context of this invention, the trail is the virtual machine's instruction sequence. When the VM is "on the trail," then so is the VMM (on its parallel "shadow" version) there is no ambiguity about position or proper direction—the VMM can then use direct execution. When at least one segment is in a non-reversible state, the cached entry corresponding to each such segment serves as a marker for returning to the trail. As long as the VM is off-trail, the VMM uses binary translation to avoid the ambiguity about which set of selectors is "correct."

At the heart of the basic embodiment of the invention is thus the VMM's incorporation of both direct execution and binary translation. Because of the differences in these two types of execution, the VMM must handle segment virtualization differently when operating in the different modes.

With direct execution, the virtual machine directly assigns segment registers. However, rather than using the virtual machine's tables, the hardware looks at the VMM's shadow tables. An attempt to use an entry with index greater than the maximum shadow entry, that is, a cached or VMM descriptor, will then lead to a general protection fault, since these entries all have a descriptor privilege level that is lower than the current privilege level. Consequently, binary translation must be used as long as this segment register is loaded in the virtual processor.

When in the direct execution mode, the memory traces installed on the descriptor tables perform two distinct operations. First, they ensure the coherency of the shadow tables with the virtual machine tables. Second, they determine whether the virtual machine contains a non-reversible segment, which occurs when the virtual machine writes to a descriptor that is currently loaded in one of the six entries of the virtual processor. Binary translation must be used whenever the processor has at least one non-reversible segment.

In the binary translation mode, the corresponding execution engine maintains two selectors for each segment register. The first selector is an "architectural selector" and is set to the segment register of the virtual processor. The second selector is a "hardware selector" and is set to the index to be loaded in the corresponding hardware segment selector. If the virtual processor is in protected mode, then the segment selector is set to either the architectural selector, when it points to a shadow entry, or to the cached selector if the segment is outside the range of the shadow entries or the segment is non-reversible.

The hardware selector must use the cached entry whenever the segment has been loaded in real mode, whenever the segment is out of the range of shadow entries, and whenever the segment is non-reversible. Direct execution can only resume when all hardware selectors match the architectural selectors and don't need the cached entries. When a protected mode segment becomes non-reversible because of an assignment to the virtual machine's descriptor table, the VMM first copies the shadow entry to the cached entry and then converts the virtual machine entry into the shadow entry.

Two aspects of the basic embodiment of the invention have been discussed above; these can be summarized as follows: The first aspect enables the use of direct execution as long as the virtual machine is running in a non-privileged mode. The second aspect refines the decision to use direct execution to the cases where no loaded segments are in a non-reversible state. At the heart of the second aspect of the basic embodiment of the invention is the segment-tracking mechanism and the use of both shadow and cached descriptors.

Execution Mode Decision

As the preceding discussion indicates, the decision of whether to use binary translation or direct execution depends on the segment state. It also depends, however, on the privilege level of the system, which, in the Intel x86 context, is also tied to which operating mode the system is in.

Three of the Intel x86 modes present obvious choices: Because the v8086 mode is truly virtualizeable, the system according to the invention may always select direct execution when the virtual machine is in this mode. On the other hand, the real and system management modes are not virtualizeable, so the decision sub-system according to the invention will always select the binary translation engine when the virtual machine is running in this mode.

A system (virtual machine) running in protected mode is not strictly virtualizeable, which forces the decision subsystem according to the invention to rely on a more sophisticated decision function, since both direct execution and binary translation may be used at different stages of the virtualization. This is discussed further below, and will also involve consideration of the particular current state of the processor.

The real mode of execution of the Intel x86 processor differs from the protected mode of operation primarily in the semantic of segment operations. REAL mode, which was the only mode in Intel systems based of the 8086 processor, does not use descriptor tables, but rather computes the offset of the segment (in the hidden part of the segment register) by multiplying the visible part by 16. It leaves the limit unmodified and ignores protection bits. The invention thus sets up the descriptor cache, but simply sets the base of the cached descriptors to 16 times the selector. Consequently, when the system is in REAL mode, then the invention does not apply the GDT/LDT procedures described above, but rather, it acts as if there is no protection at all.

The Intel processors contain the special execution mode—the v-8086 mode—that has been specifically designed to support backward compatibility of legacy REAL mode programs and operating systems on more modern operating systems. Although this mode allows the virtualization using direct execution of programs that use only REAL mode, it is useless for the virtualization of programs that alternate between REAL mode and PROTECTED mode, and rely on the segment caching properties of the processor. In practice, many DOS applications use these features to increase the amount of accessible memory.

In the x86 architecture, there are certain non-virtualizeable instructions in real mode, that is, there are instructions that behave differently in v-8086 mode without trapping in either. According to the invention, virtual-8086 mode is therefore not used to virtualize the execution in REAL mode; rather, the invention uses binary translation running in protected mode. For each segment, the architectural selector contains the real-mode segment base, and the hardware selector always points to one of the six fixed cached entries. An assignment to a segment register in real mode is then reflected in the architecture selector, and in the cached entry. Consider the following software illustration, in which Sx is the segment being loaded and "val" is the value to be loaded in the descriptor:

```
Emulate(mov Sx, val)
(1)    ARCH_SEGMENTS[Sx] = val;
(2)      GDT[CACHED_ENTRIES + Sx].offset = val * 16;
             If (Sx in {SS,DS,ES}) {
(3)      Mov Sx, (CACHED_ENTRIES+Sx);
             }
```

Statement (3) reflects the change in the virtual segment on the underlying processor. It is only required for three of the six segments because of the way that the binary translator uses segments.

The use of a binary translation sub-system to virtualize the execution of REAL mode programs is also an advancement over the state of the art. Previous legacy virtual machine monitors relied on direct execution and the special v-8086 mode of the processor to perform a comparable task. However, the use of this special mode severely limits such systems to the applications that can run in the legacy virtual machine. The invention's use of a binary translator running in protected mode removes all of these limitations.

For protected mode, the decision to use direct execution or binary translation is a function of the state of the processor and the reversibility of the segments. As is mentioned above, direct execution can be used only if the virtual machine is running in an unprivileged mode, since the architecture contains non-virtualizeable instructions. For the Intel x86 processor running in protected mode, the notion of privilege is a function of the processor's CPL (or ring level), as well as the state of the interrupt flag and IO privilege level, both of which are stored in the processor's EFLAGS register. A CPL of 0, a cleared interrupt flag, and an I/O privilege level greater or equal to the CPL indicates privileged execution for the purpose of this invention, and required binary translation. In one working prototype of the invention, a CPL of 1 also leads to the use of binary translation merely because it simplifies the implementation, even though it is rarely used in practice.

The second element of the decision for protected mode is a function of the reversibility of the segments. This may be described best by analogy to a simple state machine.

Invention as State Machine

In its manner of handling the various modes of the Intel x86 architecture, the invention can be viewed as a state machine with three states, NEUTRAL, CACHED and REAL. In the NEUTRAL state, the hidden descriptors correspond to the selector index. The system can therefore load the descriptors into the processor with no need to change the memory. The VMM can then use direct execution. The CACHED state includes all modes except REAL.

The "REAL" state corresponds to segments that have been loaded while the processor is in either REAL mode or in system management mode. The VMM according to the invention switches to binary translation whenever the state is CACHED or REAL.

State transitions occur as follows:

| From State | To State | Transition |
|---|---|---|
| NEUTRAL | CACHED | A write into memory, that is, into a loaded descriptor (one of the six segment registers in the GDT or LDT) |
| CACHED | NEUTRAL | The VM loads a segment in protected mode, that is, the VM explicitly "resets" the segment. |
| NEUTRAL | REAL | A segment load in REAL mode. (Note that there is a readable bit in the hardware processor that indicates whether the segment load is protected or REAL) |
| REAL | NEUTRAL | A segment load in protected mode. |
| CACHED | REAL | A segment load in REAL mode. |

Note that this state-machine representation makes no reference to segments loaded in virtual-8086 mode. This mode of the processor is strictly virtualizeable (with direct execution) and loads all six segments every time that the processor enters this mode. As a result, segments are handled differently in v-8086 mode, independently of this state machine.

Note also that there is one state machine per segment of the processor. The VMM according to the invention switches to direct execution only when all state machines are in the NEUTRAL state.

Binary Translation Sub-System

FIG. 2 also shows the general structure of binary translation execution engine 200 or sub-system according to the invention. The binary translation subsystem is responsible for the execution of the virtual machine whenever the hardware processor is in a state where direct execution cannot be used.

The binary translation execution engine 200 according to the invention contains several sub-systems, which, as is well known, are implemented as either stored instruction sequences (programs), addressable portions of system memory, or both. These sub-systems include a translator 230, a translation cache (TC) 240 a central loop sub-system (Resume) 242, a synchronization sub-system 244 that includes a TC synchronization map 246, a TC hash table 248, and a TC coherency sub-system 250.

The core of any binary translation execution engine is the translator 230. As is well known, such a translator reads a sequence of instructions from the virtual machine 120 and generates a corresponding sequence of instructions that emulates the original code sequence in a safe manner. For example, if the original sequence from the virtual machine contains a privileged instruction, then the translator 230 emits a code sequence that emulates that privileged instruction, possibly without even issuing any privileged instructions. The emitted code sequence may also contain code that calls support routines of the VMM; such sequences are commonly referred to as "callouts." Any known techniques may be used to design the translator 230.

Translations are stored in a large buffer, namely, the translation cache 240. This is also a known technique. An access function, that is, the TC hash table 248, keeps a map of the starting instruction pointers of the virtual machine that contain a translation, together with the starting address of the corresponding emitted sequence in the translation cache 240. In other words, once an instruction or instruction sequence from the virtual machine is received and translated, and the translation is stored, the TC hash table 248 stores the respective starting points of the sequences. This allows translations to be reused, at least as long as the original sequence has not changed. This, in turn speeds up the system, since unchanged instructions from the virtual machine do not need to be retranslated every time the VMM receives them.

The code sequence emitted by the translator 230 preferably ends with a callout to the main loop 242 to emulate the next sequence of instructions. To avoid calling the main loop too often, the binary translation execution engine 200 used in this invention preferably uses a technique known as "chaining." This is also a well-known technique that allows an emitted sequence to directly jump to the start of another emitted sequence. As in conventional systems, the central loop 242 is also preferably used by the VMM to call out to support routines; in the invention, such routines are those that are designed in any known way to emulate the desired architecture.

In order to understand the synchronization sub-system 244 one must keep in mind certain aspects of the translator 230. Note first that instructions or instruction sequences from the VM that are input to the translator 230 are indivisible or "atomic," that is, they are either completed in full or they are not considered to have been executed at all. The result of the translation of even a single instruction input to the translator 230 may, however, be more than one instruction; similarly, it is not at all certain that a sequence of n instructions input to the translator will result in exactly n instructions in the translation.

The reason this can be a problem is that, for example, an exception might occur during the execution of the translated sequence, which might then not be at the same point as, that is, in synchronization with, where the original instruction would have been. It is therefore necessary to guarantee the "atomicity" of the virtual machine's instructions if the operation of the VMM is to be transparent to the VM. As part of this safeguard, if an exception occurs during the middle of execution, then the system needs to restore the state of the VM to its previous execution entry point, that is, to the beginning of the instruction. The translator 230 thus has two outputs: 1) the code generated to for execution (the translation); and 2) a pointer into the TC synchronization map 246 so that it will be possible to reverse portions of the execution.

The TC synchronization map 246 is a table that partitions the TC 240 into regions of different lengths. Each region is associated with the address of the instruction used as the source of the translation and a type that uniquely identifies how the translation was performed.

There are two main ways of simulating execution of the IP for the virtual machine. One method is to increment the IP for each instruction. Although simple, this method is very expensive in terms of processing time, effectively adding one instruction to the end of every other instruction sequence. Another method—that preferred in this invention—is to store the IP for each TC region in the map 246. On the rare occasion when the system needs to know the position within any given region of the TC, it can then can recompute the corresponding IP.

Translation Cache Coherency

Binary translators achieve high speeds by converting an input instruction stream into a target instruction stream, and caching these translations so that the subsequent execution of the instruction stream can reuse the same target instruction sequence. Translation cache coherence is the guarantee that the binary emulator will detect changes in the original code so that it can update the emitted code accordingly.

Translation-cache coherency can be implemented exclusively using the memory tracing mechanism described above. When the translator 230 reads a new page of original code, it installs a write-only trace on the physical page. Subsequent writes to that page will indicate a potential coherency violation. At this time, the translator removes the incoherent translations from the translation cache. The simplest implementation of the removal algorithm is to remove all translations from the translation cache. This first solution has a few notable advantages. First, it relies exclusively on a single procedure—memory tracing—to detect the violations. Since that mechanism is also used by other parts of the system, it does not increase its complexity. It also eliminates the need for additional data structures otherwise required exclusively to track the list of translations based on a given page or memory range. Furthermore, it allows the translator to dynamically chain translations without having to remember the list of locations in the translation cache that jump to a given translation.

There are, however, certain disadvantages associated with a solution based solely on memory tracing. In its base form, the procedure only sets up traces on the physical pages that contain at least one single byte of code. As a result, the system must conservatively assume that any write to the page violates the coherency, even if the write corresponds to a location that does not contain code. This means that the eventual re-translation of all current translations may be needed.

According to an alternative method for assuring TC coherency, the VMM calculates a simple performance model. As one example, the VMM could assign the cost of maintaining coherency to be equal to the product of the number of violations with the cost in time of handling the conflict. Experience has shown, however, that the advantages of the "brute-force" memory-tracing-based method clearly outweigh its disadvantages, provided that the number of violations remains small. These advantages include a reduction in the memory overhead, a simpler procedure, and the ability to dynamically chain translations without having to update data structures. Rather than reducing the performance penalty associated with a violation, the goal then becomes to limit the number of violations.

The concepts and techniques for maintaining translation cache coherency are well known in the field of system virtualization and are therefore not discussed in greater detail here. Any conventional method may be implemented to ensure translation cache coherency in the invention. As the two alternatives above illustrate, the decision about which method to use will depend on a given system's requirements for performance, memory availability, and simplicity.

System Architecture According to the Invention

This invention is directed primarily to a dual execution mode virtual machine monitor VMM. However, a VMM does not operate in isolation, but rather within a larger system. The system illustrated in FIG. 7 is one in which a successfully working version of the invention has been incorporated.

Figure 7:
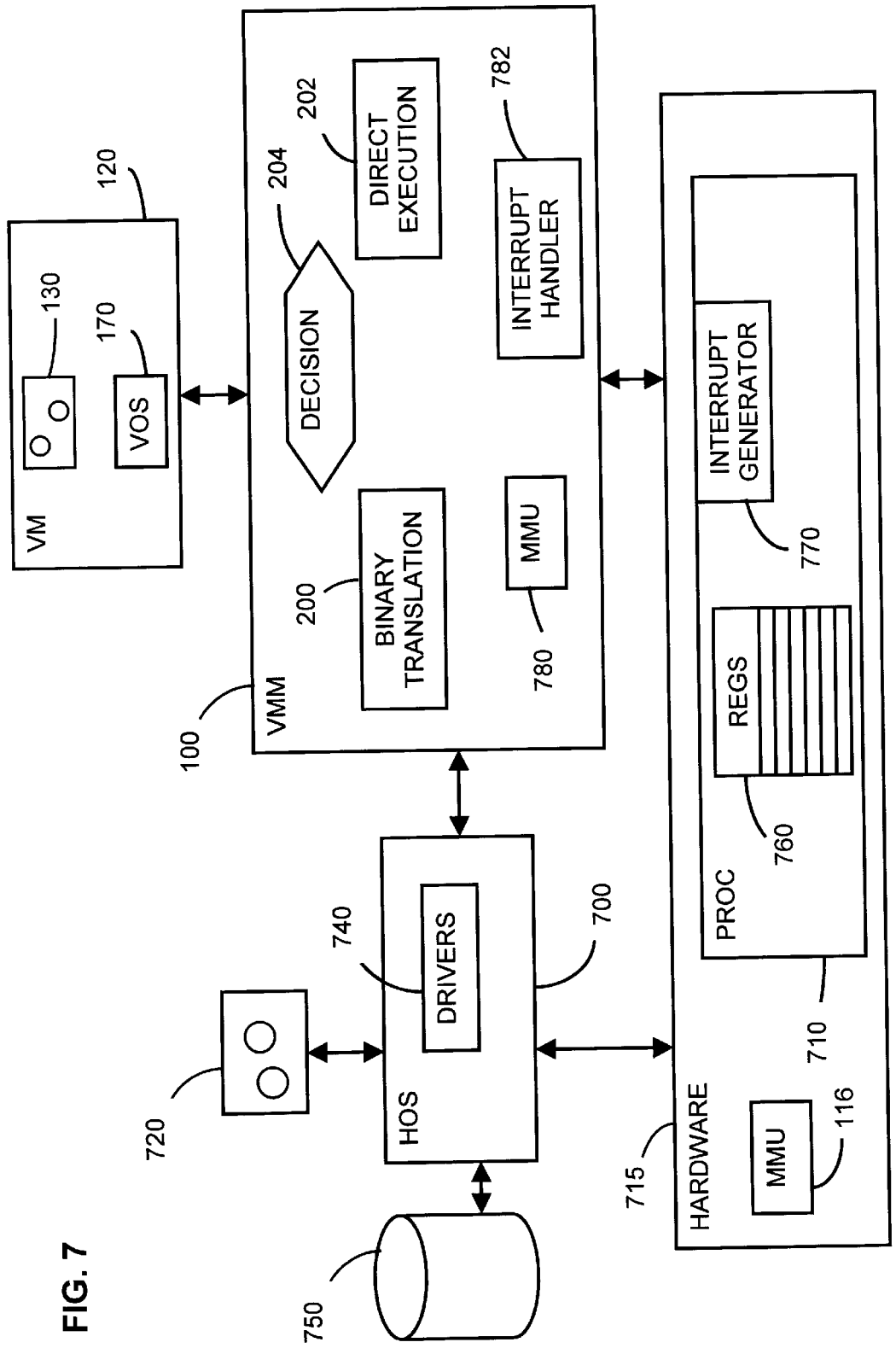
FIG. 7 is a block diagram that illustrates the high-level system architecture of a system that incorporates a system-level virtual machine monitor (VMM) according to the preferred embodiment of the invention and that includes execution engines for both binary translation and direct execution, as well as a decision sub-system to decide on and coordinate transitions between the two.

FIG. 7 shows the total system incorporating the invention in broad terms: a protected host operating system (HOS) 700 is combined with at least one unconstrained, system-level virtual machine monitor (VMM) 100 according to this invention. The VMM 100 directly uses portions of the hardware's processor 710 to execute an associated virtual machine (VM) 120. The way in which this is preferably done, and the additional sub-systems included, are described in co-pending U.S. patent application Ser. No. 09/151,175 "System and Method for Virtualizing Computer Systems," which is incorporated by reference here. Note that it is also possible to run the VMM without any host operating system at all; this is also explained in U.S. patent application Ser. No. 09/151,175.

FIG. 7 shows one virtual machine monitor 100 supporting one virtual machine 120. The system according to the invention makes it possible to include any number of VMM's in a given implementation, each supporting a corresponding VM, limited only by available memory and speed requirements, and to switch between the various included VMM's. It is assumed merely for the sake of simplicity that the VMM 100 is the one actively in operation on the system.

A set of applications (symbolized by circles) is indicated in FIG. 7 by the block 720. This set of applications is assumed to be designed to run "normally" via the existing host operating system (HOS) 700. In other words, the applications 720 are written for the HOS 700. Other applications, however, may not be. For example, an application written to run on one of Microsoft's operating systems, such as any of the Windows systems, will not normally run on the Unix operating system, and vice versa. If the host operating system is, for example, some version of Windows, with Intel-based hardware, then a Unix application cannot normally be expected to run on the system. This invention makes this possible.

Assume that the virtual machine (VM) 120 is designed as a virtual Unix system and that the applications 130 in the VM are thus Unix-based applications. The virtual machine 120 then will also include the virtual operating system (VOS) 170, which communicates with the "real," or "physical" system hardware 715 via the VMM 100. Note that many different types of applications may be run on the same physical machine, regardless of what the host operating system and hardware are. Each application is thus associated with its intended operating system, either the host operating system 700 (applications 720), or with a respective virtual operating system 170, associated in turn with a respective VMM 100.

Current computer systems, and especially personal computers, support a wide range of external devices 750 (including storage devices, video cards and any of the many other known types of peripherals) that each interact in a different manner with the system software. As a result, each device requires special system software support. Corresponding device drivers 740 are typically downloaded into the operating system to provide this support. FIG. 7 also illustrates the registers 760 and interrupt generator 770 of the hardware processor 710.

Note that the VMM 100 in the illustrated, preferred embodiment of the invention is installed at the same system level as the host operating system 700 itself. One advantage of this configuration, which is described in greater detail in co-pending U.S. patent application Ser. No. 09/151,175, is that the VMM 100 can configure the processor 710, in particular, its segment registers 760, and its memory management unit (MMU) 116, independently of any constraints imposed by the host operating system.

In this description of the preferred embodiment of the invention, it is assumed that the hardware 715, as the word implies, does in fact consist of physical components. This will be the case in most applications of the invention. On the other hand, the invention may also be used in those cases in which the "hardware" is instead a software simulation or emulation of the desired hardware architecture, to which the VMM 100 and the host operating system 700 (if included) are operationally connected in any known manner. The term "hardware" is thus to be understood as encompassing both possibilities.

Asynchronous, Deferred Shadowing Embodiment of the Invention

The description above deals not only with structural and operational aspects of different embodiments of the invention in general, but also with the basic embodiment in particular. These features are also described in the co-pending parent application U.S. patent application Ser. No. 09/179,137. The features of the invention unique to the deferred shadowing embodiment of the invention will now be described and illustrated.

As is mentioned above, this embodiment of the invention is an improvement and extension of the basic embodiment: The basic embodiment described above is a virtualization system that enforces strict coherence, or synchronization, between shadowed segment descriptors belonging to a virtual machine (VM), and the corresponding shadow segment descriptors created and managed by the VMM. This deferred shadowing embodiment of the invention relaxes the strict coherence requirement by deferring the synchronization of a shadowed descriptor (a VM descriptor for which a shadow descriptor has been created in the VMM) until the VM attempts to use it.

Key to this invention is a set of mechanisms that notify the VMM of any attempt to load an unsynchronized shadowed descriptor. Whenever the VMM receives such notification, it verifies that the VM is allowed to load the shadowed descriptor, and then establishes synchronization for the pair (shadowed/shadow) of descriptors. The invention improves virtualization performance not only by reducing the number of descriptors that need to be kept coherent, but also by providing the VMM with a flexible mechanism to invalidate descriptors. A descriptor is invalidated, for example, when the VM unmaps or remaps the memory page it is located in, or when the VM sets a new segment descriptor table.

Review of Concepts and Terminology

A segmented computer architecture such as x86 allows the software to set a segment descriptor table (DT) by specifying its starting memory address, called the base, and its size, called the limit. FIG. 3 illustrates this structure. Once a DT is defined, the software may load a segment from the table by executing a segment-loading instruction provided by the architecture. A segment-loading instruction specifies the offset, called selector, of the desired segment descriptor relative to the DT's base. FIG. 4 shows this.

A descriptor defines the size and location of a segment, but also its protection attributes, such as access rights and privilege level. Some segmented architectures also feature a memory management unit (MMU) 116 for mapping linear addresses to physical ones. The mapping is performed on regions of memory usually referred to as pages. A typical page size is 4 KBytes.

As before, the x86, a widely used architecture that features both segmentation and an MMU, is used here as the example for illustrating all concepts of the invention. It is therefore assumed that mapping and memory tracing take place at the level of granularity of a memory page. The invention will, however, work equally well with other levels of granularity, that is, size and distribution of memory portions, instead of the standard x86 "page." The term memory "page" is thus to be interpreted as any level of segmentation, that is, conceptual or functional partitioning, of the memory which can be mapped and traced by some mechanism, such as an MMU, which may be implemented in hardware or software or both. Modifications of the invention, to the extent they are necessary at all beyond a change of terminology from "page" to some other name for the basic memory portion, to enable it to operate with such other memory portions, will be immediately obvious to those skilled in the art.

On the x86, an instruction of a program that loads a segment with selector value Val into segment register Sk is processed as follows:

The processor verifies that Val contains an index that is within the bounds of the descriptor table, that is, it must be less than the table's limit. If the index Val is out of bounds, the processor delivers an error to the program in the form of a general protection fault.

Calculate the linear address of the desired descriptor by adding Val to the table's base. Verify that the page containing the descriptor is mapped. If the page is unmapped, then deliver an error to the program in the form of page fault.

Verify that the program is authorized to load the segment by checking the descriptor's protection attributes. The "present" attribute (for example, segment present bit) must be set to value 1 (that is, it must indicate "present"), and the program's privilege level must be at least as privileged as the descriptor's DPL (descriptor privilege level). If any of these checks fails, an error is delivered to the program in the form of a "Segment Not Present" fault or general protection fault.

If all the above checks pass, the descriptor information is copied into the hidden segment state for register Sk. The x86 architecture has six segment registers. Once a segment is loaded, the descriptor at selector Val is said to be active, that is, at least one segment register was loaded from Val. If a descriptor is active, then any future modification to it is non-reversible, because the modification does not affect the hidden state.

Virtualization of Segments

In operation, the VMM sets the hardware/physical processor's descriptor table register DTR to its own DT. The DTR of the virtual processor points to the VM's DT.

As is described in greater detail above, the VMM's DT contains three types of descriptors: VMM, cached, and shadow. VMM descriptors are for internal use by the VMM, will depend on the given VMM implementation, and will be determined according to normal programming conventions. Cached descriptors model the hidden state of active VM segments.

Finally, the VMM creates one shadow descriptor in the VMM's DT for each descriptor in the VM's DT that is to become shadowed. A shadow descriptor (in the VMM's DT), combined with its corresponding shadowed descriptor (the VM's DT) is referred to here as a shadow descriptor pair, or simply descriptor pair. A shadow descriptor is constructed from a conversion process of the corresponding shadowed descriptor as described above—in particular, the privilege level of the shadow descriptor may need to be set higher than that of the corresponding shadowed descriptor, for example, when the VM descriptor's privilege level is set to most privileged, that is, to value 0 (note that, in the x86 architecture, a higher level or value means less privilege). Moreover, the descriptor's limit may be truncated to protect the VMM.

An important property of a descriptor pair is that both descriptors are identified by the same selector value in their respective descriptor tables. In the preferred embodiment of the deferred shadowing embodiment of the invention, if a particular VM descriptor is shadowed, then all descriptors with lower-numbered selectors, that is, that are located from the table base up to the shadowed descriptor, are also shadowed. Thus, if the VM descriptors are ordered V1, V2, . . . , Vn, and if V3 is shadowed, then the VMM preferably also shadows V1 and V2. The advantage of this can be understood with an example: Let NS be the number of shadow descriptors. Then any selector with value less than or equal to NS identifies a descriptor pair.

This arrangement makes it easy for the VMM to determine whether a particular pair is shadowed or not: If a selector is greater than NS, then the corresponding descriptor is not shadowed; otherwise, it is. Other arrangements are also possible. For example, the VMM could maintain an array with single-bit elements—one per descriptor in the current VM descriptor table—indicating whether each respective descriptor is shadowed. For any given selector, the VMM could then scan the array to determine if the corresponding descriptor is shadowed. This arrangement is, however, in general more complicated and time-consuming than the preferred method described above.

Not all descriptors in the VM's DT are shadowed. For instance, if the VM's DT is larger than the VMM's DT, then there will be fewer shadow descriptors in the VMM's DT than descriptors in the VM's DT. Accordingly, some VM descriptors have no corresponding descriptor in the VMM's DT and are, consequently, unshadowed.

Segment-Loading Instruction in Direct Execution

In direct execution mode, the VMM may allow segment-loading instructions issued by the VM, like any other instructions, to execute in their unmodified form. The VMM need only intervene when the VM tries to load an unshadowed descriptor. By way of example, suppose that the VM attempts to execute the instruction MOV Sx, Val (move selector value Val into segment register Sx). Given that the "real" DT is the VMM's DT, this instruction actually loads the descriptor with selector value Val from the VMM's DT, not the VM's DT. If Val<NS, then the selector corresponds to a descriptor pair, and the shadow descriptor may be loaded without the VMM's intervention. If, however, Val>NS, then the selector refers to an unshadowed descriptor, and the VMM must assume control over execution by the VM. This is always the case, because an attempt to load an unshadowed descriptor in direct execution always causes a fault. If NS<Val<VMM's descriptor table limit, then a general protection fault is generated, because the DPL of cached and VMM descriptors is more privileged than the privilege level given to the VM during direct execution. If Val>VMM's descriptor table limit, then a general protection fault is generated.

Segment-Loading Instruction in Binary Translation

In binary translation mode, more work is involved in the processing of segment- loading instructions. This is discussed above. By way of example, a simplified description of a translated sequence of instructions for MOV Sx, Val would be:
   Translated Code for (MOV Sx,Val)
   if (Val<NS) // shadowed?
     HARDWARE_SEGMENTS[x]=Val
     ARCH_SEGMENTS[x]=Val
     MOV Sx, Val
   else call function Emulate (MOV Sx, Val)

The sequence first checks to see if the selector Val refers to a shadow descriptor pair. If so, then two arrays containing emulated segment register values, HARDWARE_SEGMENTS[ ], and ARCH_SEGMENTS[ ], are updated with the new selector value. An actual MOV Sx,Val instruction is then executed to cause the hardware to load the shadow descriptor into the hardware segment register Sx. If Val does not refer to a shadow descriptor pair, then the higher-level VMM function called Emulate (MOV Sx,Val) is invoked. The details of this function are discussed above.

Synchronous Shadowing in Basic Embodiment of the Invention

In the basic embodiment of the invention, described above, descriptor pairs are always synchronized, that is, a shadow descriptor in the VMM's DT always contains an up-to-date converted version of its corresponding shadowed descriptor in the VM's DT. The physical memory-tracing mechanism is then used to detect modifications to any shadowed descriptor and to trigger the VMM to immediately update the corresponding shadow descriptor.

Keeping all shadow descriptors synchronized at all times can be costly. First, while a DT may contain thousands of segment descriptors, a program typically uses only a small subset of those descriptors. There is, moreover, a performance cost associated with the conversion process used to construct a shadow descriptor—but with an altered privilege level—from a shadowed VM descriptor. Synchronous shadowing of all descriptor pairs means that a large fraction of the conversion work may be wasted if the VM never loads many of the converted descriptors. There is also a significant cost for maintaining a physical trace on a page for the purposes of maintaining synchronization. This cost includes the overhead of processing a page fault, in addition to the conversion work itself.

Second, a VM may choose to switch frequently between multiple DTs. Synchronous shadowing then requires all shadow descriptors to be converted every time the VM sets a new DT. This obviously can lead to greatly degraded performance.

Third, on segmented architectures featuring a MMU (such as component 116, see FIG. 7), the VMM must also deal with the problem of the VM remapping or unmapping pages which overlap the VM's DT. Remapping a page containing descriptors is equivalent to modifying all of those descriptors. Synchronous shadowing then requires all shadow descriptors corresponding to the modified shadowed descriptors to be re-converted upon the detection of the remapping. Moreover, some segmented architectures such as x86 allow individual pages belonging to the descriptor table to be unmapped. A particular page that contains VM descriptors may thus also get unmapped, thereby invalidating all of them. This is tolerated behavior, as long as the software does not attempt to load a segment descriptor located on an unmapped page, because such an action would lead to a page fault.

Deferred (Asynchronous) Shadowing

According to this invention, the VMM defers the synchronization, that is, the conversion and/or updating, of a shadow descriptor until the VM attempts to load the corresponding shadowed descriptor. In the preferred embodiment of the invention, the shadow descriptors are created up-front, that is, initially reserved in the VMM's DT, although they are not initialized to any meaningful values until they are later synchronized.

An unsynchronized shadow descriptor is not updated and is allowed to contain undefined information. Asynchronous shadowing offers two performance benefits: First, an unsynchronized shadow descriptor does not need conversion; second, if a VM page consists entirely of unsynchronized shadowed descriptors, then it does not need to be physically traced at all, and modifications to it may proceed without causing a fault.

Moreover, as is described below, asynchronous shadowing conveniently handles the issue of unmapped or remapped DT pages. Upon detecting a change in the mapping of a page overlapping the VM's DT, the VMM desynchronizes the shadow descriptors corresponding to shadowed descriptors residing on the affected page; these shadow descriptors then become unsynchronized. Thus, the work of determining whether the page a descriptor belongs to is mapped, and the resulting conversion work, if mapped, is deferred until the VM actually loads a descriptor on the page, if ever.

Asynchronous Shadowing Mechanisms

In this section, basic mechanisms are described or reviewed that the VMM uses to set descriptors to the unsynchronized state and to detect the loading of unsynchronized descriptors. It also introduces linear tracing, the mechanism the VMM uses to detects changes in the VM's linear page mappings.

Linear Tracing

In the description of the invention above, the concept of memory tracing has referred to physical tracing, that is, the detection of accesses to specific physical pages using the hardware MMU's page protection mechanisms. "Linear tracing," in contrast, is a feature of this invention, in particular, of the VMM itself, more precisely, of a sub-component 780 (see below) within the VMM that emulates the MMU of the virtual processor.

As is well known, on a MMU-enabled computer architecture, software controls the MMU by setting up a data structure in memory, called a page table, and executing special privileged instructions, which are referred to here as "MMU instructions." Changing the mapping of a page typically involves updating an entry in a page table, then activating the change by executing an MMU instruction, for example, the instruction MOV CR3,val, which is also known as a TLB flush operation. As in the synchronous embodiment of the invention described above, the VMM controls the "real," that is physical, hardware MMU 116 and sets up its own page tables.

The VMM must also virtualize the "virtual" MMU assumed to be in, or associated with, the VM's virtual processor. Therefore, it must detect both changes to the VM's page tables and the execution of MMU instructions. The VMM can detect changes to the VM page tables by placing physical traces (using the hardware MMU's page protection feature) on the pages containing the tables.

Most computer architectures, including the x86, require software to run at the most privileged level in order to execute MMU instructions. If the VM attempts to execute a MMU instruction while running in direct execution mode, then the underlying hardware will generate a general protection fault. This is because when running in direct execution, the VMM's instructions operate at a reduced privilege, that is, not the one required to execute MMU instructions. The VMM will then detect and handle the fault. In binary translation mode, the VMM monitors and controls the execution of any VM instruction, including MMU instructions. In summary, the VMM is capable of detecting all changes to the VM's page mappings.

Once the VMM detects any change to the page mappings, it is handled by a MMU emulation sub-component 780 (FIG. 7) included in the VMM. This sub-component, which can be implemented using known programming techniques, provides a service called linear tracing to other VMM sub-components. In this invention, a linear trace specifies a range of pages in the address space, and a callback function. Whenever the MMU emulation sub-component detects that the mapping of a page in the range has changed, it invokes the callback function with the page's address and a numerical code indicating whether the page was remapped to a new physical page, or unmapped, meaning that the linear page is not mapped to any physical page in the virtual processor, which is under the VM's control.

Descriptor Desynchronization

A shadow descriptor, or a group of shadow descriptors, is desynchronized by setting up in the VMM a mechanism which detects any future attempt by the VM to load the descriptor(s). The mechanism must work both in direct execution and binary translation modes, and co-exist with the mechanism used to detect the loading of an unshadowed descriptor.

Page Unmapping

The preferred mechanism for desynchronizing descriptors is to take advantage of the hardware's MMU to unmap an entire page of the VMM's DT. This method can be used, however, only if the page contains only unsynchronized shadow descriptors. The page cannot be unmapped if, for example, it contains other types of descriptors such as synchronized shadow descriptors, VMM descriptors, or cached descriptors. Executing a segment-loading instruction which loads an unmapped descriptor then leads the hardware to raise a page fault, as explained above. An interrupt handler 782 in the VMM, which monitors any interrupts and exceptions generated by the hardware interrupt generator 770, then detects the issued page fault and determines the descriptor's selector by subtracting the DT's base from the linear fault address provided by the hardware.

Figure 8:
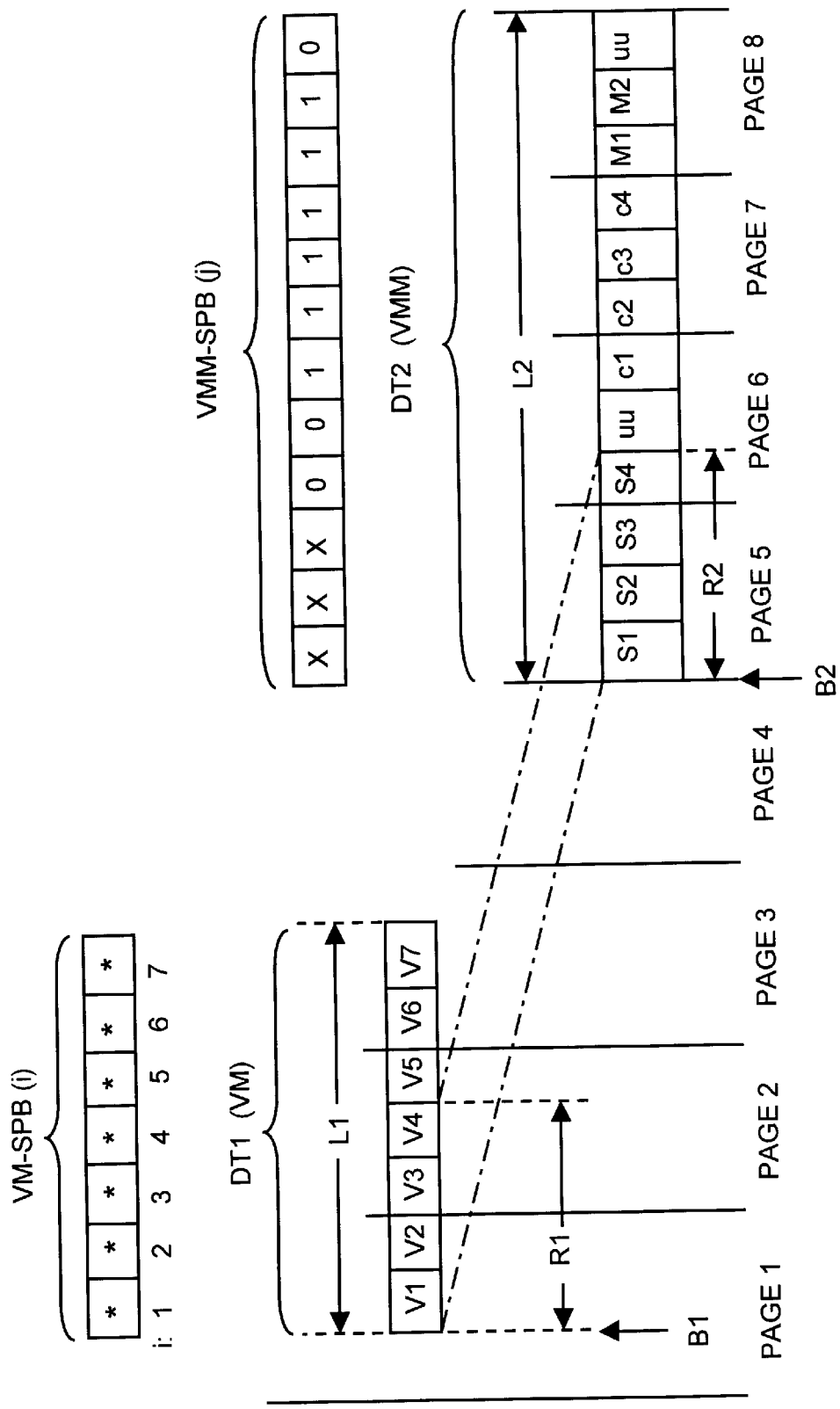
FIG. 8 illustrates a greatly simplified example of a VMM descriptor table that a VMM creates in part to shadow active descriptors of a VM. This figure also illustrates the concept of asynchronous or "deferred" shadowing of descriptors.

See FIG. 8, which illustrates how one VM descriptor table DT1 and a corresponding VMM descriptor table DT2 are arranged in memory. In this greatly simplified example, only eight pages of memory, Page 1, Page 2, . . . , Page 8, are shown. In actual implementations, there may be millions of pages. For example, typical pages in the x86 architecture each take up 4 kB, so that there would be one million pages even in a 4 GB memory. Note that each VM will contain data indicating the highest limit of available memory. All descriptor tables created by the VMM are preferably located in portions of memory beyond the VM upper limit in order to isolate the VMM DT's from VM actions.

In the illustrated example, the VM's DT1 contains seven descriptors V1, V2, . . . , V7. Of course, in an actual system, there will typically be many more descriptors, even thousands, depending on which virtual OS is running in the VM. Note that, in existing x86 systems, a descriptor is much smaller than a page (8 bytes vs. 4096 bytes), so that a page in general contains many more descriptors than shown in the example.

The first four of these descriptors are shown as being shadowed in the VMM's DT2 by the shadow descriptors S1, S2, S3, S4. This may be because each of V1–V4 have been used by the VM, or simply because V4 was, whereupon the lower-numbered descriptors are also shadowed in order to allow the use of page tracing to detect changes to the shadowed descriptors V1–V4. By way of example, the VMM's DT2 is shown as also including unused descriptor regions uu, cached descriptors c1–c4 and descriptors M1, M2 used by the VMM itself.

As FIG. 8 illustrates, the VMM's DT2 is preferably page aligned, that is, it is stored so that its base B2 starts on a page boundary. In FIG. 8, DT2 begins with Page 5. Note, however, that as FIG. 8 shows, the invention does not require the VM's DT1 base B1 to be at a page boundary.

If the VMM chooses to desynchronize all shadow descriptors, it can desynchronize the first three, S1–S3, by unmapping Page 5, since the page only contains shadow descriptors; however, S4 cannot be desynchronized using page unmapping because Page 6 contains non-shadow descriptors. This is preferably handled using protection attributes, as is described below.

As an additional optimization, note that a VM page containing only desynchronized shadowed descriptors or unshadowed descriptors, or both, does not need to be traced at all, neither physically nor linearly, since the VMM can ignore modifications or remappings of the corresponding page. In the example, all traces may be removed from pages 1 and 2 if S1–S4 are desynchronized, since the VMM is not concerned with the state of V1–V4. Traces need only be installed on VM pages containing at least one synchronized shadowed descriptor.

Descriptor Protection Attributes

As is known, and also discussed above, each descriptor in the x86 architecture also includes at least one protection attribute, such as a "segment present bit" (SPB). Analogous attributes are found in other architectures. In FIG. 8, an array VM-SPB(i) of SPB's is shown for the VM, with one SPB for each of the VM descriptors V1, . . . , V7. Similarly, an array VMM-SPB(i) of SPB's is shown for the VMM, with one SPB for each of the VM descriptors S1, . . . , S4 and the two descriptor regions marked uu. Although both shadowed (in DT1) and shadow (in DT2) descriptors have SPBs, they may be used for different purposes, depending on whether or not a pair is synchronized.

For each VM descriptor that has been synchronized, for example, V2, then the VMM will maintain the VMM copy VMM-SPB(2) the same as the corresponding VM-SPB(2). If this SPB=1, then the VM is allowed to load the descriptor (assuming all other checks pass); otherwise, the VMM forwards a "not-present" fault to the VM. If the pair is not synchronized, then the VMM may use the shadow descriptor's SPB for a totally different purpose, namely, forcing the hardware to raise a not-present fault if the VM ever tries to load the unsynchronized descriptor.

Note that the VM may set the SPB's for the descriptors V1–V7 arbitrarily, which is indicated by the "values" shown as stars "*". The SPB of a shadowed descriptor (in DT1) comes into play only when the VM actually loads that descriptor, and determines whether or not a NP fault is to be forwarded. What is important, however, are SPB's of unsynchronized shadows. For S1–S3, the SPB can be set to any value (indicated by the "don't care" entries "X"), since page 5 is unmapped and the VMM will be notified of any attempt to load S1–S3 through a page fault.

In the x86 architecture, loading any descriptor whose SPB is 0 causes a "segment-not-present" fault, which the VMM's interrupt handler detects. The SPB of S4 must therefore be set to "not present" (zero), because page 6 is mapped. The SPB of unused descriptors uu must also be set to zero, so that the VMM can detect the loading of an unshadowed descriptor. The SPB of cached and VMM descriptors should generally be set to 1.

Descriptor Table Management

The VMM in this asynchronous shadowing embodiment of the invention improves DT virtualization performance relative to the synchronous, basic embodiment using the mechanisms described above. In general, when the VM makes changes to its entire DT1, or individual pages within its DT1, the preferred procedure is for the VMM to desynchronize the affected descriptors. The VMM then synchronizes each unsynchronized descriptor only when the VM attempts to load it (or a descriptor with a higher-numbered selector).

Setting a New DT

When the VM sets a new descriptor table, for example by re-assigning its DTR, all shadow descriptors are desynchronized. This can done quickly, since the page unmapping mechanism allows large numbers—entire pages—of descriptors to be desynchronized at a time. For example, on the x86 architecture, a single page holds 512 descriptors. The VMM then selects the number of VM descriptors from the new table to shadow. If (and, preferably, only if) the VM page contains at least one synchronized, shadowed descriptor then the VMM traces (physically and linearly) that page. When the VM sets a new DT, traces on the pages containing the old DT are removed, but no new traces are installed, assuming the VMM chooses to desynchronize all shadows at this time, which is the preferred embodiment.

The VM may also set its DT1 to an empty table, for example, in applications in which only the GDT or LDT is needed, but not both. In this case, there are no VM descriptors to shadow. Descriptors reserved in the VMM's DT2 whose purpose is to shadow then become unused. However, they also need to be desynchronized so that any attempt by the VM to load a descriptor from the empty table will generate a fault. When processing that fault, the VMM then detects that the VM's DT1 is empty, and forwards an appropriate error to the VM. In the empty table case, no physical or linear tracing is needed.

Note that the previously set DT1 may contain active descriptors, that is, descriptors that the VM loaded into segment registers. Before desynchronizing all shadow descriptors, the VMM preferably performs a non-reversibility check on all segment registers, using techniques explained above or already known in the art, and caches them if necessary. More precisely, as is explained in greater detail in the parent patent application, U.S. patent application Ser. No. 09/179,137, caching a descriptor in the x86 architecture means copying the contents of the shadow copy into the cached descriptor corresponding to one of the 6 segment registers Sk, and setting HARDWARE_SEGMENTS[k] to the selector for the cached descriptor.

Page Mapping Chances

When the VMM is notified of a change in the mapping of a page containing shadowed descriptors through the linear tracing mechanism, the corresponding shadow descriptors in the VMM's DT2 are desynchronized, regardless of whether the page was remapped or unmapped (this distinction is used later, when the VM attempts to load a desynchronized descriptor from that page). As in the case of setting a new DT, the VMM preferably performs a non-reversibility check on the descriptors before desynchronizing them.

Descriptor Synchronization

As discussed above, the VMM is notified of any attempt to load an unsynchronized shadow descriptor, either from a page fault in its DT, or from a segment-not-present fault. The fault can occur while the VM is running in either direct execution or binary translation modes. Before synchronizing the descriptor, the VMM first queries the MMU emulation component 780 to verify that the VM page containing the corresponding shadowed descriptor is mapped. If the page is unmapped, a page fault is forwarded directly to the VM, because such a fault would properly be raised even in non-virtualized systems. An appropriate fault is also forwarded to the VM, even if the corresponding page is mapped, if the descriptor it attempts to load is illegal, for example, of the wrong data type for the current instruction. The remainder of this discussion assumes that the VM page is mapped.

If the attempt to load the unsynchronized descriptor was detected from a page fault, it indicates that the VMM page containing the descriptor was unmapped. The VMM then establishes synchronization for the descriptor pair by first remapping the page, and then constructing the shadow VMM descriptor from the corresponding shadowed VM descriptor.

The mechanism for remapping a page is known. To summarize the mechanism, however, assume the common case in which pages are identified using 32-bit addresses. Assume further that the memory has 4 GB and that each page consists of 4 kB. In systems with the x86 architecture, each of $2^{10}$=1024 4-byte entries in a page directory point to a page table, which in turn includes $2^{10}$=1024 4-byte entries, each of which point to a 4 kB page of physical memory. Ten bits of the address are thus used to select an entry in the page directory; ten other bits are used to select an entry, say, X, in the page table pointed to by the directory pointer; and 12 bits are used to select the entry on the physical page pointed to via the page table. Each address thus is a concatenation of three pointers having different granularity:

(directory index:page table pointer:actual value on page)

Remapping can thus be done simply by changing the page table pointer from X to some other value Y. Unmapping a page can be done equally easily by changing X to some predetermined but undefined null pointer.

Remapping and unmapping also relate to the issue of non-reversibility: If a VM attempts to unmap or remap one or more pages on which actually loaded VM descriptors are stored, then the VMM should create cached copies of all the loaded descriptors that fall within the affected range, and then switch to execution by binary translation, as described above. The system can return to direct execution when what is loaded in the hidden part of the respective VM descriptor is what is actually defined by the descriptor in memory.

The invention also deals efficiently with the case in which unsynchronized shadow descriptors reside on the same VMM page as at least one synchronized one.

For example, in FIG. 8, all of the shadow descriptors S1–S3 reside on a single memory page (Page 5), but the descriptor S4, which must be synchronized with V4, is on the same page as an unused descriptor uu, as well as a cached descriptor c1. Given that the page has been remapped, the MMU page fault mechanism can no longer be used to keep them unsynchronized. One option is to keep them in the unsynchronized state by setting their SPB=0. Another option is to synchronize them all.

If the attempt to load the unsynchronized descriptor is detected due to a segment-not-present fault, then the VMM page containing the shadow descriptor is already mapped, and the synchronization work only applies to one descriptor.

The following pseudocode summarizes the actions discussed above:

Synchronize(Val):

1. Determine the selector of the descriptor in the VMM's DT that is responsible for the fault. If the fault is a page fault, then the selector is determined by subtracting the DT's base from the faulting linear address passed by the hardware (on x86 this address is contained in register CR2). If the fault is a not-present fault or general protection fault, then the selector is stored, in an x86 system, in the "error code," which is located in the exception stack frame.

2. If the selector exceeds the VM's DT limit, then forward a general protection fault to the VM. Then end. (Example: VM tries to load V8, which is outside of its table and therefore does not exist.)

3. Determine the linear address of the corresponding VM descriptor in the VM DT. This is achieved by adding the selector to the VM DT base (B1, in FIG. 8).

4. If the VM page containing the VM descriptor is not mapped, then forward a page fault to the VM. Then end. (Example: VM tries to load V7, and page 3 is not mapped.)

5. Inspect the VM descriptor to determine if the VM is allowed to load the descriptor.

If SPB=0, then forward a not-present fault to the VM.

If the VM's current privilege level is less privileged than the descriptor's privilege level, or the descriptor is of the wrong type, then forward a general protection fault to the VM. Then end.

6. If the descriptor is unshadowed copy and convert the descriptor to the cached descriptor corresponding to the segment register being loaded. (Example: the VM loads V5, which is unshadowed, into ES, causing a not-present fault because the hardware actually tries to load the 'uu' immediately following S4. The VMM then copies and converts the VM descriptor into the cached descriptor for ES.)

ELSE (The fault was caused by an unsynchronized shadow)

If fault is a page fault (Example: V2/S2) remap the VMM page containing the unsynchronized descriptor, then synchronize the descriptor from the shadowed descriptor.

Then, two options:

Unsynchronize all other descriptors on the same page, or

Synchronize all other descriptors on the same page

ELSE (The fault is a not-present fault)

Synchronize the shadow descriptor from the shadowed descriptor (Example: V4/S4)

7. Restart execution of the segment-loading instruction.

As an example, refer once again to FIG. 8.

DT1, defined by the base B1 and limit L1, is the VM's DT and is located on Pages 1–3, which are all initially mapped. Note that DT1 need not be page-aligned. DT2, defined by the base B2 and limit L2, is the VMM's DT and is located on Pages 5–8. As mentioned above, DT2 is preferably page-aligned. Note that DT1 and DT2 are different in size.

In the simplified, illustrated example, DT2 has 12 descriptors, of which six (those other than the cached descriptors and VMM descriptors) are available for shadowing. Assume the VMM, based on the criteria described above, decides to shadow the four VM descriptors V1–V4. The number of shadowed segments is thus NS=4. R1 is the range of VM descriptors that the VMM decides to shadow. The descriptors in this range, V1–V4 are the shadowed descriptors; V5–V7 are unshadowed. R2 is the range of VMM descriptors that shadow the VMM descriptors. The descriptors within this range, S1–S4, are the shadow descriptors.

When the VM sets DT1 as the new table, all shadow descriptors are desynchronized. S1–S3 can be desynchronized together by unmapping page 5. S4 shares the same page as non-shadow descriptors uu and c1 and must therefore be desynchronized by clearing its SPB. Note that there is not yet any need for the VMM to install a linear trace on Pages 1–3, since, at this point in the example, these pages contain only unsynchronized shadowed descriptors.

Suppose now that the VMM tries to load the segment described by V2 into segment register ES. It would therefore execute an instruction similar to MOV ES,2, where 2 is the offset (or selector) of the desired descriptor. (Note that, on the x86 architecture, the selector is expressed in bytes, so its actual value would be the descriptor index multiplied by the size of a descriptor in bytes.) Since the VMM configures the "real" (hardware) DT pointer (the DTR) to point to DT2, not DT1, the underlying hardware will actually try to load S2 instead of V2. Page 5 is, however, unmapped, so the hardware raises a page fault, which the VMM detects in the usual manner.

Upon inspecting the faulting instruction and its selector, the VMM determines there was an attempt to load the unsynchronized descriptor S2. The VMM first locates the corresponding shadowed descriptor V2, followed by the VM page it resides on (Page 1), and verifies that Page 1 is mapped. The VMM then synchronizes V2 by first mapping Page 5 and constructs S2 by converting V2 as described above (for example, with a reduced privilege level).

The preferred embodiment of the invention also synchronizes all other shadow descriptors on the page, here S1 and S3. To maintain synchronization for those descriptors, the VMM installs physical and linear traces on Pages 1 and 2, which are the pages on which the corresponding shadowed descriptors V1, V2 and V3 are located. Finally, the VMM restarts the originally faulting instruction (here, MOV ES,2). This time, however the instruction succeeds (assuming V2 has valid contents), and execution continues.

Now suppose that the VMM tries to load the segment described by V4 into segment register DS. This causes the hardware to try to load S4, resulting in a segment-not-present fault because S4's SPB bit is not set. Upon inspecting the faulting instruction and its selector, the VMM determines there was an attempt to load the unsynchronized descriptor S4. The VMM first locates the corresponding shadowed descriptor V4, followed by the VM page it resides on, Page 2, and verifies that Page 2 is mapped. The VMM then synchronizes S4 by constructing it from V4. It then installs a physical and linear trace on Page 2 (which, in this example, is not necessary because this page was already traced as a result of synchronizing V2). Execution then continues.

Assume now that the VM unmaps or remaps Page 2. The VMM will then be notified through the linear trace mechanism described above. Upon notification, the VMM determines which shadowed descriptors correspond to shadow descriptors on the affected page. In this case, V3 and V4 are on Page 2, so assuming that V3/S3 and V4/S4 are currently synchronized descriptor pairs, then the VMM will desynchronize both pairs by clearing the present bits (SPB) for S3 and S4. Before S4 is desynchronized, however, its contents are preferably copied into a cached descriptor for DS in the VMM table, for example, c1, because, in this case, DS was loaded from S4 and is now in a non-reversible state. Note that, in this example, in which it is assumed that V3 was not loaded into any segment register, it will not be necessary to create a cached copy of V3.

We claim:

1. In a computer system that has:

a memory;

a plurality of memory segments, each corresponding to a range of the memory;

a method for virtualizing a computer comprising the following steps:

loading in the computer system a virtual machine monitor (VMM) and at least one virtual machine (VM) that has at least one virtual processor and is operatively connected to the VMM for running a sequence of VM instructions, the virtual machine (VM) having at least one VM descriptor table that has, as entries, VM segment descriptors, each VM segment descriptor containing memory location identifiers corresponding to a memory segment;

in the VMM, establishing at least one VMM descriptor table, including at least one shadow descriptor table storing, for predetermined ones of the VM segment descriptors, corresponding shadow descriptors, each of the predetermined ones of the VM segment descriptors for which a shadow descriptor is stored being a shadowed descriptor;

initializing the shadow descriptors in a desynchronized state;

comparing the shadow descriptors with their respective corresponding shadowed VM descriptors;

detecting a lack of correspondence between the shadow descriptor table and the corresponding VM descriptor table; and updating and thereby synchronizing each shadow descriptor with its respective shadowed VM descriptor, but deferring the updating of at least one shadow descriptor until the VM attempts to load the corresponding shadowed descriptor.

2. A method as in claim 1, further including the step, in the VMM, of synchronizing selected ones of the VM segment descriptors, whereby synchronization comprises updating the shadow descriptors in the VMM to maintain correspondence with their respective shadowed, synchronized VM descriptors upon every change by the VM to the shadowed, synchronized VM descriptors.

3. A method as in claim 2, in which the memory segments are hardware memory segments and the computer system includes at least one hardware segment register and at least one hardware descriptor table that has, as entries, hardware segment descriptors, each hardware segment descriptor containing memory location identifiers corresponding to a memory segment, further including the step of preventing access and loading into any hardware segment register by the VM of unsynchronized shadow descriptors.

4. A method as in claim 3, in which the computer system has a memory management unit (MMU) that includes a memory map and is able to trace accesses to designated memory pages and cause a page fault to be generated upon any attempt by software to access a memory page that is not mapped, that is, not included in the memory map, further including the following steps:

storing the VMM descriptor table and thus also the shadow descriptors on VMM-associated memory pages; and in the VMM, selectively mapping and unmapping the VMM-associated memory pages, thereby causing page faults to be generated upon any attempt to load into any hardware segment register a shadow descriptor located on any unmapped VMM-associated memory page.

5. A method as in claim 4, further including the following steps:
- A) upon attempted loading by the VM of a VM segment descriptor into a hardware segment register, determining, in the VMM, whether a corresponding shadow descriptor exists and is synchronized in the VMM descriptor table;
- B) upon determining that a corresponding shadow descriptor does exist and is synchronized in the VMM descriptor table, loading the corresponding synchronized shadow descriptor;
- C) upon determining that a corresponding synchronized shadow descriptor does not exist, determining whether the page containing the VM segment descriptor is mapped;
  1) upon determining that the page containing the VM segment descriptor is unmapped, forwarding a corresponding fault to the VM;
  2) upon determining that the page containing the VM segment is mapped:
     a) mapping the page on which the corresponding shadow descriptor is located;
     b) synchronizing the shadow descriptor with the VM segment descriptor that the VM attempted to load;
     c) restarting attempted loading of the VM segment descriptor into the respective hardware segment register,
- thereby ensuring loading of only synchronized shadow descriptors.

6. A method as in claim 5, further including the step of determining if the page of the VMM descriptor table containing the synchronized shadow descriptor contains only shadow descriptors and, if so, synchronizing all shadow descriptors on the page whenever one is synchronized, thereby enabling whole memory page detection of attempted loading into any hardware segment register of any shadow descriptors located on the respective page.

7. A method as in claim 4, further including the step of tracing accesses to the designated memory pages via a preexisting hardware MMU in the computer system.

8. A method as in claim 4, further including the following steps:
- sensing, in the VMM, changes of mapping of any page(s) of the VM descriptor table; and
- in the VMM, desynchronizing and preventing access by the VM to all shadow descriptors corresponding to shadowed descriptors on the page(s) of the VM descriptor table whose mapping is being changed.

9. A method as in claim 8, further including the following step:
- in the VMM, determining whether any VM segment descriptor on the page(s) of the VM descriptor table whose mapping is being changed is currently loaded in any hardware segment register, and, for each such VM segment descriptor so loaded, creating a cached copy of the corresponding shadow descriptor, thereby enabling reversibility of each such VM segment descriptor.

10. A method as in claim 3, further including the following steps:
- A) setting a protection attribute of shadow descriptors to a not present state;
- B) upon attempted loading by the VM of a VM segment descriptor, determining, in the VMM, whether the protection attribute of the corresponding shadow descriptor is in a present state or in the not present state;
- C) upon determining that the protection attribute is in the present state, loading the corresponding shadow descriptor;
- D) upon determining that the protection attribute is in the not present state, determining whether the page on which the VM segment descriptor is located is mapped;
  1) upon determining that the page on which the VM segment descriptor is unmapped, forwarding a corresponding fault to the VM;
  2) upon determining that the page on which the VM segment descriptor is mapped:
     a) synchronizing the shadow descriptor with the VM segment descriptor that the VM attempted to load;
     b) setting the protection attribute of the shadow descriptor to the present state;
     c) restarting attempted loading of the VM segment descriptor into the respective hardware segment register,
- thereby enabling detection of attempted loading of individual unsynchronized descriptors regardless of other data located on the same memory page.

11. A method as in claim 1, in which each shadow descriptor is first updated and thereby synchronized with its respective shadowed VM descriptor at the time of the first use of the descriptor by the VM.

12. In a computer system that has a memory, a plurality of hardware memory segments, each corresponding to a range of the memory, at least one hardware segment register, and at least one hardware descriptor table that has, as entries, hardware segment descriptors, each hardware segment descriptor containing memory location identifiers corresponding to a memory segment, a method for virtualizing a computer comprising the following steps:
- A) loading in the computer system a virtual machine monitor (VMM) and at least one virtual machine (VM) that has at least one virtual processor and is operatively connected to the VMM for running a sequence of VM instructions, the virtual machine (VM) having at least one VM descriptor table that has, as entries, VM segment descriptors, each VM segment descriptor containing memory location identifiers corresponding to a memory segment;
- B) in the VMM, establishing at least one VMM descriptor table, including at least one shadow descriptor table storing, for predetermined ones of the VM segment descriptors, corresponding shadow descriptors, each of the predetermined ones of the VM segment descriptors for which a shadow descriptor is stored being a shadowed descriptor and each shadow descriptor being initialized in a desynchronized state;
- C) comparing the shadow descriptors with their respective corresponding shadowed VM descriptors;
- D) detecting a lack of correspondence between the shadow descriptor table and the corresponding VM descriptor table;
- E) updating and thereby synchronizing each shadow descriptor with its respective shadowed VM descriptor, but deferring the updating of at least one shadow descriptor until the VM attempts to load the corresponding shadowed descriptor, according to the following steps F)–P):
- F) in the VMM, synchronizing selected ones of the VM segment descriptors, whereby synchronization comprises updating the shadow descriptors in the VMM to maintain correspondence with their respective shadowed, synchronized VM descriptors upon every change by the VM to the shadowed, synchronized VM descriptors;
- G) preventing access and loading into any hardware segment register by the VM of unsynchronized shadow descriptors;

H) storing the VMM descriptor table and thus also the shadow descriptors on VMM-associated memory pages;

I) in the VMM, selectively mapping and unmapping the VMM-associated memory pages, thereby causing page faults to be generated upon any attempt to load into any hardware segment register a shadow descriptor located on any unmapped VMM-associated memory page;

J) upon attempted loading by the VM of a VM segment descriptor into a hardware segment register, determining, in the VMM, whether a corresponding shadow descriptor exists and is synchronized in the VMM descriptor table;

K) upon determining that a corresponding shadow descriptor does exist and is synchronized in the VMM descriptor table, loading the corresponding synchronized shadow descriptor;

L) upon determining that a corresponding synchronized shadow descriptor does not exist, determining whether the page containing the VM segment descriptor is mapped;
 1) upon determining that the page containing the VM segment descriptor is unmapped, forwarding a corresponding fault to the VM;
 2) upon determining that the page containing the VM segment is mapped:
  a) mapping the page on which the corresponding shadow descriptor is located;
  b) synchronizing the shadow descriptor with the VM segment descriptor that the VM attempted to load;
  c) restarting attempted loading of the VM segment descriptor into the respective hardware segment register, thereby ensuring loading of only synchronized shadow descriptors;

M) setting a protection attribute of selected ones of the shadow descriptors to a not present state;

N) upon attempted loading by the VM of a VM segment descriptor, determining, in the VMM, whether the protection attribute of the corresponding shadow descriptor is in a present state or in the not present state;

O) upon determining that the protection attribute is in the present state, loading the corresponding shadow descriptor;

P) upon determining that the protection attribute is in the not present state, determining whether the page on which the VM segment descriptor is located is mapped;
 1) upon determining that the page on which the VM segment descriptor is unmapped, forwarding a corresponding fault to the VM;
 2) upon determining that the page on which the VM segment descriptor is mapped:
  a) synchronizing the shadow descriptor with the VM segment descriptor that the VM attempted to load;
  b) setting the protection attribute of the shadow descriptor to the present state;
  c) restarting attempted loading of the VM segment descriptor into the respective hardware segment register, thereby enabling detection of attempted loading of individual unsynchronized descriptors regardless of other data located on the same memory page.

13. A system for virtualizing a computer comprising:
a memory;
a plurality of hardware memory segments, each corresponding to a range of the memory;
at least one hardware segment register;
at least one hardware descriptor table that has, as entries, hardware segment descriptors, each hardware segment descriptor containing memory location identifiers corresponding to a memory segment;
a virtual machine monitor (VMM); and
a virtual machine (VM) that has at least one virtual processor and is operatively connected to the VMM for running a sequence of VM instructions;
in which:
the virtual machine (VM) has at least one VM descriptor table having, as entries, VM segment descriptors;
the VMM includes:
 VMM descriptor tables, including at least one shadow descriptor table storing, for predetermined ones of the VM segment descriptors, corresponding shadow descriptors, each of the predetermined ones of the VM segment descriptors for which a shadow descriptor is stored being a shadowed descriptor that is initialized in a desynchronized state; and
 descriptor tracking means:
  for comparing the shadow descriptors with their respective corresponding VM segment descriptors;
  for detecting a lack of correspondence between the shadow descriptor table and the corresponding VM descriptor table; and
  for updating and thereby synchronizing each shadow descriptor with its respective VM segment descriptor but deferring the updating of at least one shadow descriptor until the VM attempts to load the corresponding shadowed descriptor.

14. A system as defined in claim 13, in which the descriptor tracking means is further provided for synchronizing selected ones of the VM segment descriptors, whereby synchronization comprises updating the shadow descriptors in the VMM to maintain correspondence with their respective shadowed, synchronized VM descriptors upon every change by the VM to the shadowed, synchronized VM descriptors.

15. A method as in claim 14, in which the descriptor tracking means is further provided for preventing access and loading into any hardware segment register by the VM of unsynchronized shadow descriptors.

16. A system as in claim 15, further comprising:
a memory management unit (MMU) that includes a memory map and forms page-tracing means for tracing accesses to designated memory pages and for causing a page fault to be generated upon any attempt by software to access a memory page that is not mapped, that is, not included in the memory map;
in which:
the VMM descriptor table and thus also the shadow descriptors are stored on VMM-associated memory pages; and
the VMM includes means for selectively mapping and unmapping the VMM-associated memory pages and thereby for causing page faults to be generated upon any attempt to load into any hardware segment register a shadow descriptor located on any unmapped VMM-associated memory page.

17. A system as in claim 16, in which the VMM is further provided:
for sensing changes of mapping of any page(s) of the VM descriptor table; and for desynchronizing and preventing access by the VM to all shadow descriptors corresponding to shadowed descriptors on the page(s) of the VM descriptor table whose mapping is being changed.

18. A system as in claim 15, in which the VMM is further provided:

A) for setting a protection attribute of shadow descriptors to a not present state;

B) upon attempted loading by the VM of a VM segment descriptor, for determining whether the protection attribute of the corresponding shadow descriptor is in a present state or in the not present state;

C) upon determining that the protection attribute is in the present state, for loading the corresponding shadow descriptor into the VM-designated one of the hardware segment registers;

D) upon determining that the protection attribute is in the not present state, for determining whether the page on which the VM segment descriptor is located is mapped;

1) upon determining that the page on which the VM segment descriptor is unmapped, for forwarding a corresponding fault to the VM;

2) upon determining that the page on which the VM segment descriptor is mapped:

a) for synchronizing the shadow descriptor with the VM segment descriptor that the VM attempted to load;

b) for setting the protection attribute of the shadow descriptor to the present state;

c) for restarting attempted loading of the VM segment descriptor into the respective hardware segment register, thereby detecting attempted loading of individual unsynchronized descriptors regardless of other data located on the same memory page.

* * * * *

UNITED STATES PATENT AND TRADEMARK OFFICE
CERTIFICATE OF CORRECTION

PATENT NO. : 6,785,886 B1
APPLICATION NO. : 09/648394
DATED : August 31, 2004
INVENTOR(S) : Beng-Hong Lim, Bich C. Le and Edouard Bugnion It is certified that error appears in the above-identified patent and that said Letters Patent is hereby corrected as shown below:

Title page item (73) Assignee, change

"VMWare, Inc., Palo Alto, CA (US)"

to

--VMware, Inc., Palo Alto, CA (US)--

Signed and Sealed this

Sixth Day of October, 2009

David J. Kappos
*Director of the United States Patent and Trademark Office*